United States Patent
Cowles, Jr. et al.

(10) Patent No.: US 10,400,818 B2
(45) Date of Patent: Sep. 3, 2019

(54) TRACK ROLLER BEARINGS WITH ROLLING ELEMENTS OR LINERS

(71) Applicant: Roller Bearing Company of America, Inc., Oxford, CT (US)

(72) Inventors: John H. Cowles, Jr., Unionville, CT (US); Jay Phoenix, Bristol, CT (US); Arnold E. Fredericksen, New Hartford, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 603 days.

(21) Appl. No.: 14/959,589

(22) Filed: Dec. 4, 2015

(65) Prior Publication Data

US 2016/0083081 A1    Mar. 24, 2016

Related U.S. Application Data

(60) Continuation-in-part of application No. 14/287,572, filed on May 27, 2014, which is a continuation-in-part
(Continued)

(51) Int. Cl.
*F16C 19/48* (2006.01)
*B64C 9/02* (2006.01)
(Continued)

(52) U.S. Cl.
CPC ............... *F16C 19/48* (2013.01); *B64C 9/02* (2013.01); *B64C 9/22* (2013.01); *B64D 45/02* (2013.01);
(Continued)

(58) Field of Classification Search
CPC ...... F16C 19/48; F16C 23/041; F16C 29/045; F16C 33/60; B64C 9/02; B64C 9/22; Y02T 50/44
(Continued)

(56) References Cited

U.S. PATENT DOCUMENTS 2,528,987 A * 11/1950 Albett .................... C10K 1/121
                                                        384/570
2,620,147 A * 12/1952 Cook, Jr. .................. B64C 9/16
                                                        244/216
(Continued)

FOREIGN PATENT DOCUMENTS

CN         202213712 U     9/2012
WO      2014209714 A1    12/2014

OTHER PUBLICATIONS

European Search Report issued in corresponding European Application No. 15198028.1, dated Apr. 21, 2016, pp. 1-9.
(Continued)

*Primary Examiner* — Brian M O'Hara
*Assistant Examiner* — Keith L Dixon
(74) *Attorney, Agent, or Firm* — Murtha Cullina LLP

(57) ABSTRACT

A track roller assembly includes a split inner ring, a split outer ring, a one piece inner ring and/or a one piece outer ring and a liner or plurality of rolling elements engaging therewith, the track roller assembly being disposed in a structure of an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, and an Airbus A380 aircraft.

28 Claims, 17 Drawing Sheets

Related U.S. Application Data of application No. 13/940,305, filed on Jul. 12, 2013, now abandoned, which is a continuation-in-part of application No. 13/719,541, filed on Dec. 19, 2012, which is a continuation-in-part of application No. 13/114,099, filed on May 24, 2011, now Pat. No. 8,387,924, which is a division of application No. 12/201,062, filed on Aug. 29, 2008, now Pat. No. 8,025,257, application No. 14/959,589, which is a continuation-in-part of application No. 14/728,402, filed on Jun. 2, 2015.

(60) Provisional application No. 62/088,042, filed on Dec. 5, 2014, provisional application No. 62/152,448, filed on Apr. 24, 2015, provisional application No. 60/992,746, filed on Dec. 6, 2007, provisional application No. 62/007,210, filed on Jun. 3, 2014, provisional application No. 62/090,247, filed on Dec. 10, 2014.

(51) Int. Cl.
| | |
|---|---|
| *B64C 9/22* | (2006.01) |
| *B64D 45/02* | (2006.01) |
| *F16C 33/74* | (2006.01) |
| *F16C 11/02* | (2006.01) |
| *F16C 17/10* | (2006.01) |
| *F16C 23/04* | (2006.01) |
| *F16C 29/04* | (2006.01) |
| *F16C 33/60* | (2006.01) |
| *F16C 33/78* | (2006.01) |

(52) U.S. Cl.
CPC .............. *F16C 11/02* (2013.01); *F16C 17/10* (2013.01); *F16C 23/041* (2013.01); *F16C 29/045* (2013.01); *F16C 33/74* (2013.01); *F16C 33/60* (2013.01); *F16C 33/7886* (2013.01); *F16C 2326/43* (2013.01); *Y02T 50/44* (2013.01)

(58) Field of Classification Search
USPC ................................ 244/213, 214, 215, 218
See application file for complete search history.

(56) References Cited

U.S. PATENT DOCUMENTS

| | | | | |
|---|---|---|---|---|
| 2,711,938 | A * | 6/1955 | Herrmann | F16C 33/543 384/572 |
| 3,546,762 | A * | 12/1970 | Martin | B23D 31/003 29/413 |
| 3,581,267 | A | 5/1971 | Schreffler | |
| 4,286,761 | A * | 9/1981 | Musgrove | B62D 3/02 244/215 |
| 4,399,970 | A * | 8/1983 | Evans | B64C 9/24 244/214 |
| 4,437,631 | A * | 3/1984 | Martens | B64C 9/24 244/210 |
| 4,585,192 | A | 4/1986 | Clifford-Jones | |
| 4,685,184 | A | 8/1987 | Satkamp | |
| 4,687,162 | A | 8/1987 | Johnson et al. | |
| 4,753,402 | A * | 6/1988 | Cole | B64C 9/22 244/210 |
| 4,838,503 | A * | 6/1989 | Williams | B64C 9/22 244/213 |
| 5,056,938 | A | 10/1991 | Ahlman et al. | |
| 5,219,232 | A | 6/1993 | Adams et al. | |
| 5,528,706 | A * | 6/1996 | Harimoto | B21D 53/12 384/523 |
| 5,839,699 | A * | 11/1998 | Bliesner | B64C 9/24 244/214 |
| 6,149,105 | A * | 11/2000 | Jaggard | B64C 9/28 244/214 |
| 6,180,574 | B1 * | 1/2001 | Ryan | C10M 107/28 508/106 |
| 7,101,297 | B2 | 9/2006 | Larson | |
| 7,249,735 | B2 | 7/2007 | Amorosi et al. | |
| 8,025,257 | B2 * | 9/2011 | Gyuricsko | B64C 9/22 244/214 |
| 8,292,235 | B2 | 10/2012 | Wollaston et al. | |
| 8,387,924 | B2 | 3/2013 | Gyuricsko et al. | |
| 8,490,927 | B2 | 7/2013 | Parker | |
| 8,590,834 | B1 | 11/2013 | Nelson | |
| 8,876,065 | B2 | 11/2014 | Grieco et al. | |
| 8,967,549 | B2 | 3/2015 | Cathelain et al. | |
| 8,967,551 | B2 | 3/2015 | Parker | |
| 9,016,636 | B2 | 4/2015 | Parker | |
| 9,140,296 | B2 * | 9/2015 | Caspall | F16C 35/063 |
| 2011/0220762 | A1 | 9/2011 | Gyuricsko et al. | |
| 2014/0061381 | A1 | 3/2014 | Gyuricsko et al. | |
| 2014/0131512 | A1 | 5/2014 | Gyuricsko et al. | |
| 2014/0339358 | A1 | 11/2014 | Swartley et al. | |
| 2015/0060607 | A1 | 3/2015 | Havar et al. | |
| 2015/0191242 | A1 | 7/2015 | Maclean et al. | |
| 2015/0219148 | A1 | 8/2015 | Wemhoener | |

OTHER PUBLICATIONS

SAE AS5928, Aerospace Standard, SAE Aerospace, published Sep. 2005, pp. 1-4.

* cited by examiner

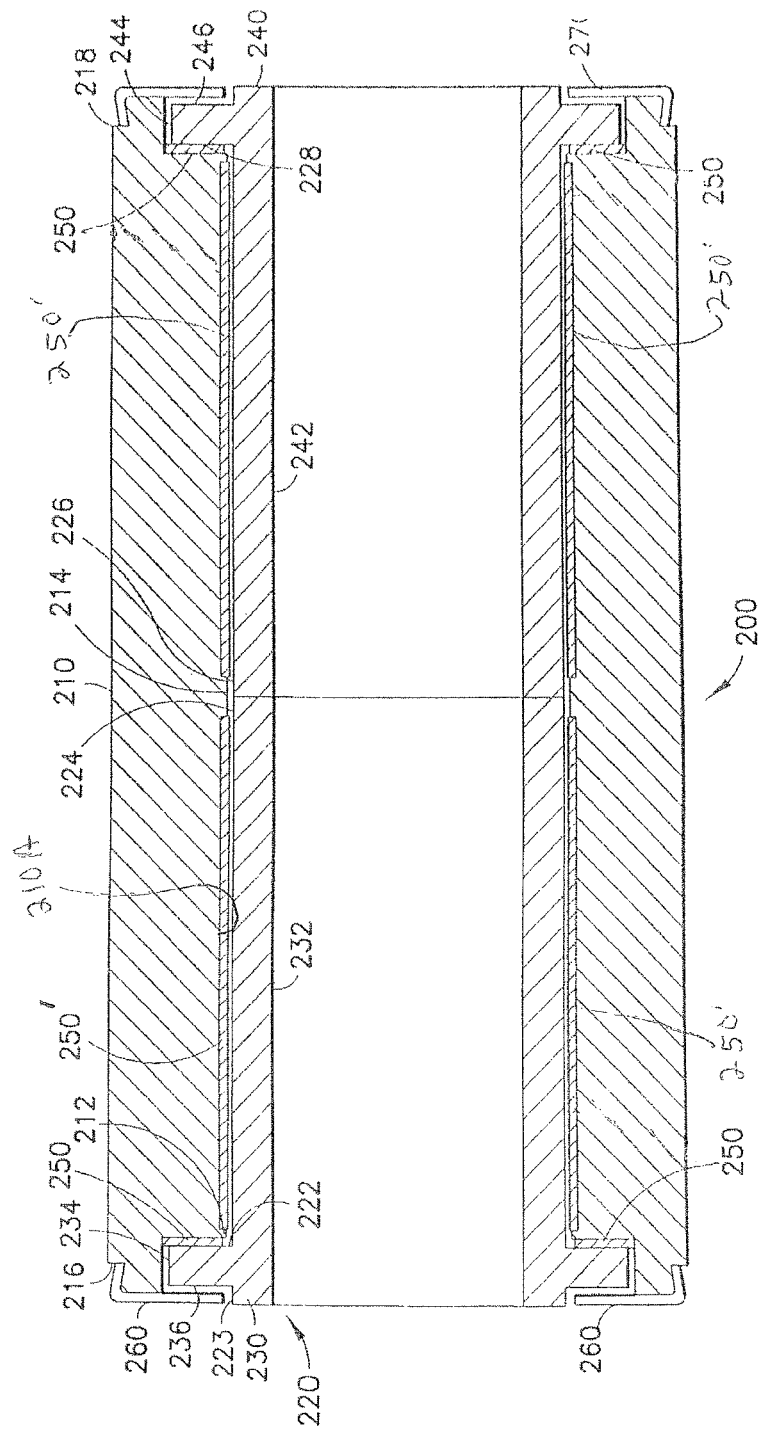

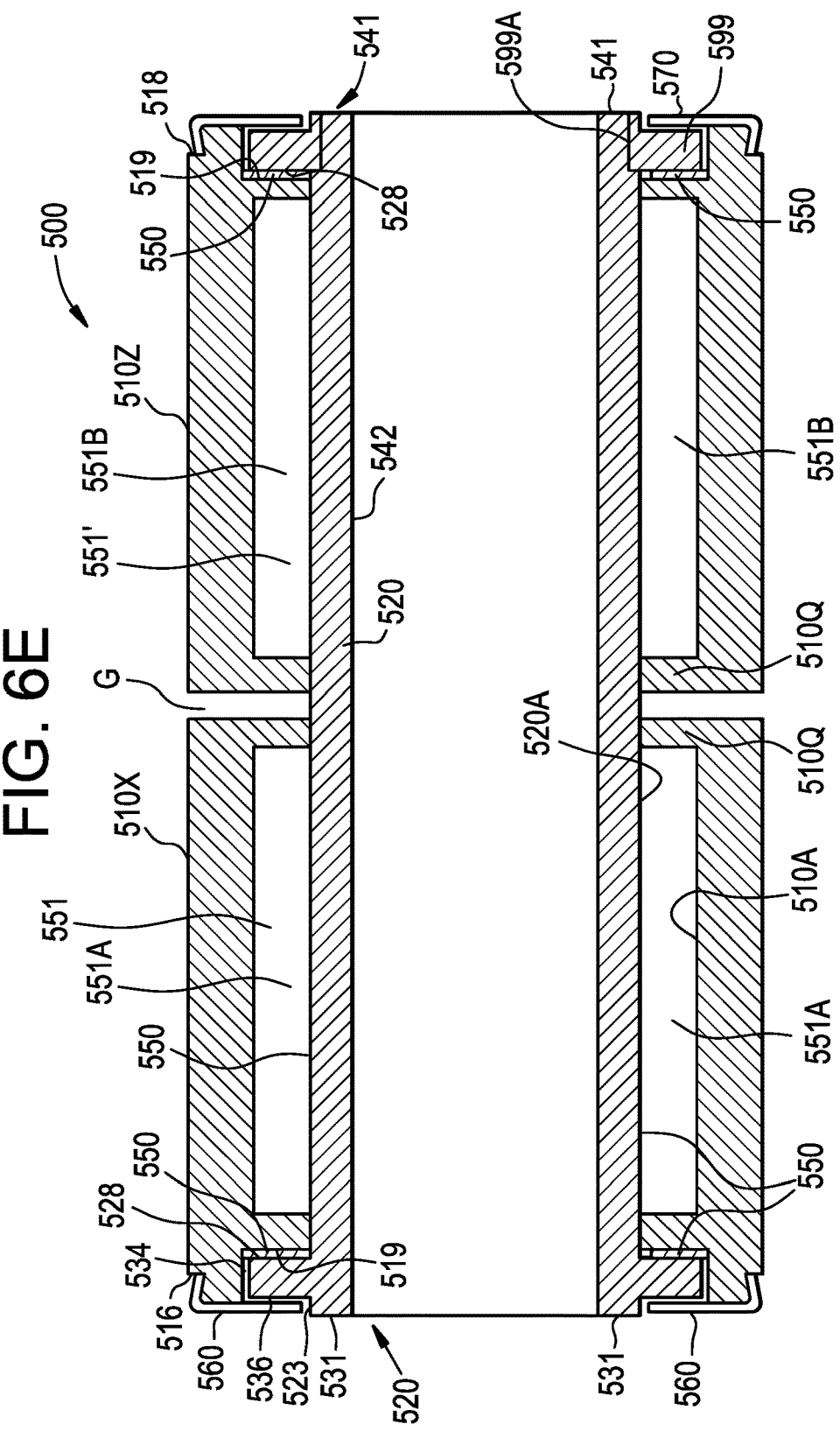

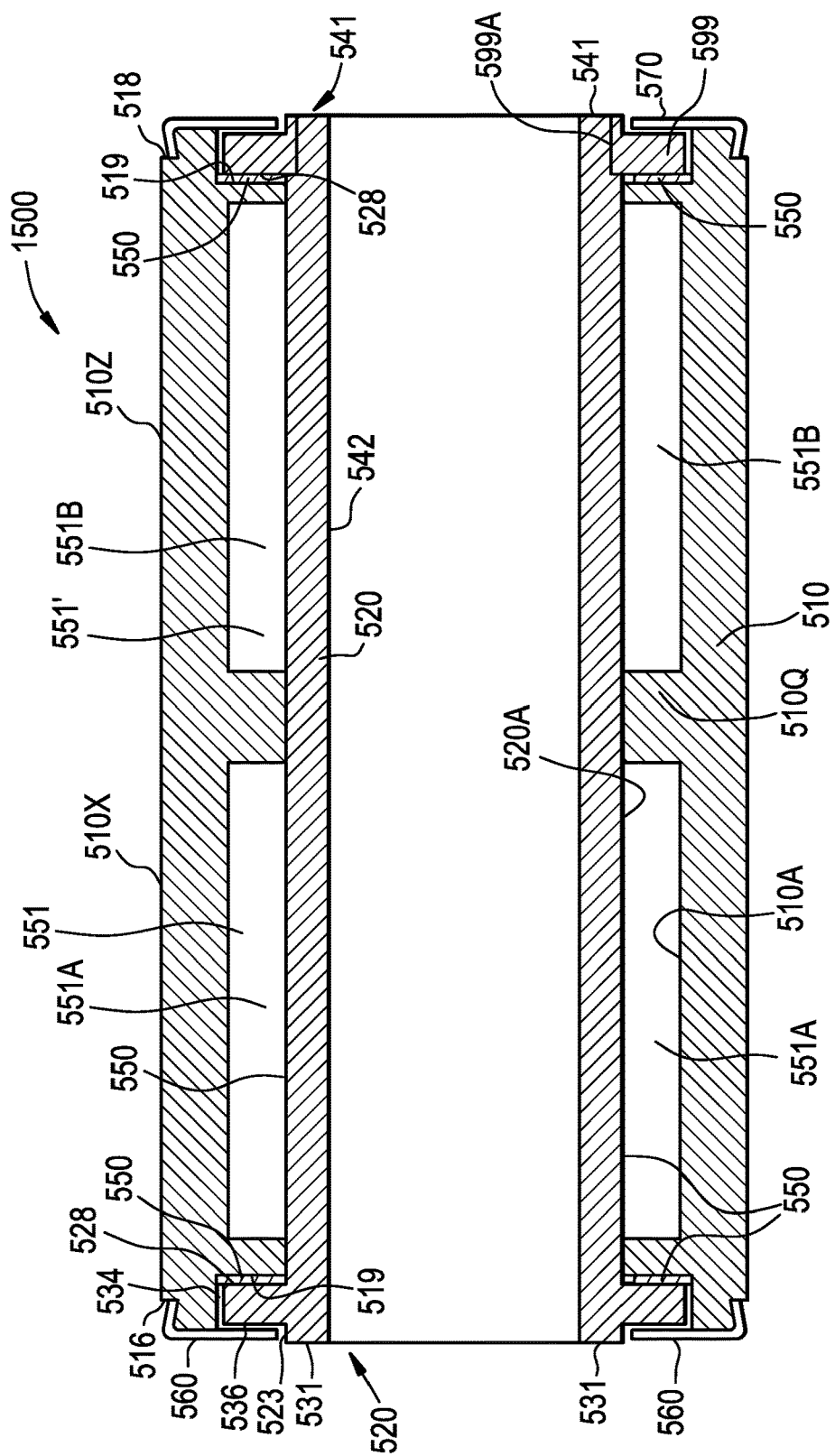

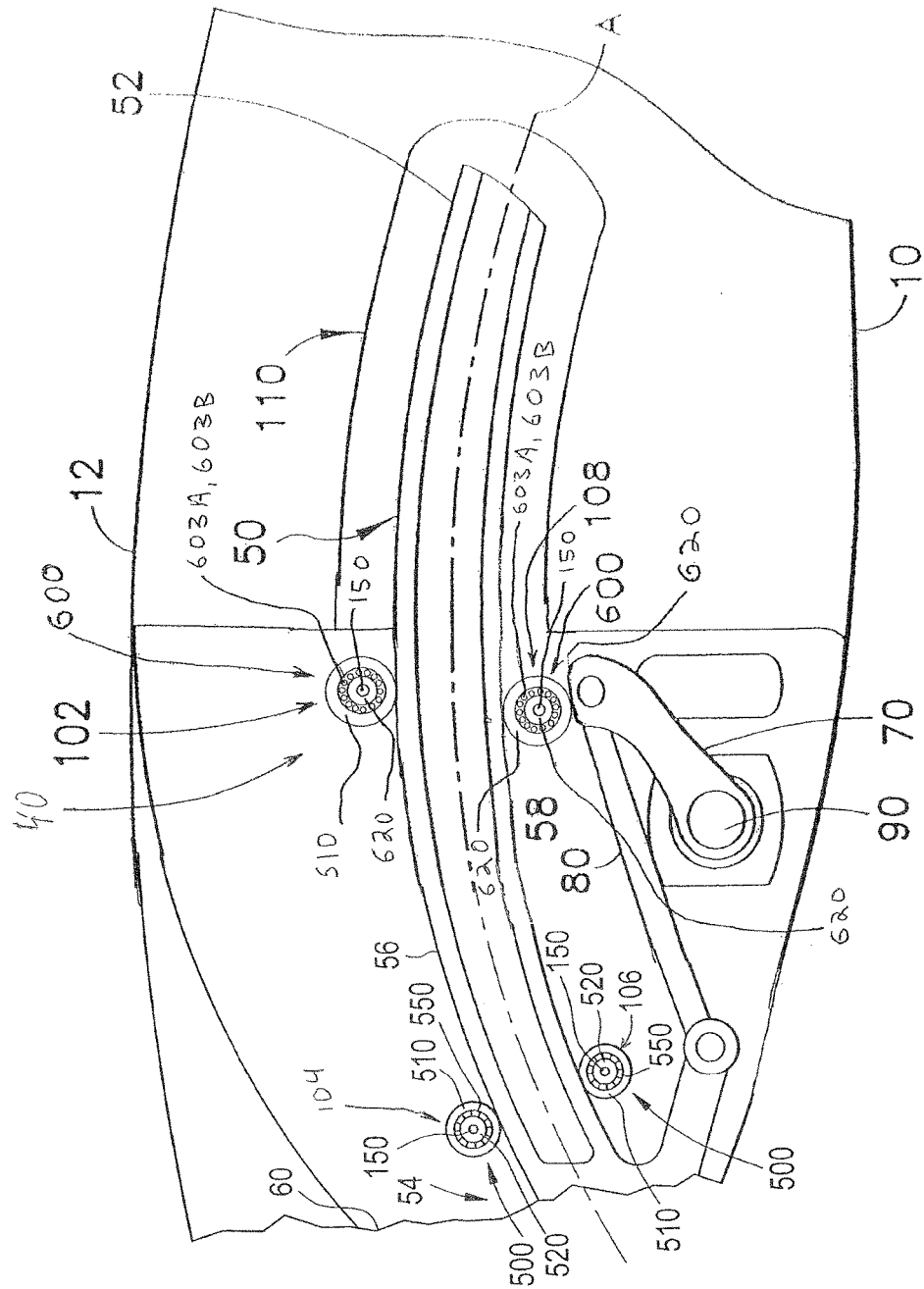

TRACK ROLLER BEARINGS WITH ROLLING ELEMENTS OR LINERS

CROSS REFERENCE TO RELATED APPLICATIONS

This application: 1) claims the benefit of U.S. Provisional Application No. 62/088,042, filed Dec. 5, 2014 and U.S. Provisional Application No. 62/152,448 filed Apr. 24, 2015, which are incorporated herein by reference in their entirety; 2) is a continuation in part of and claims priority benefit under 35 U.S.C. § 120 to U.S. patent application Ser. No. 14/287,572, filed May 27, 2014 which is a continuation in part of and claims priority benefit under 35 U.S.C. § 120 to U.S. patent application Ser. No. 13/940,305, filed Jul. 12, 2013, which is a continuation in part of and claims priority benefit under 35 U.S.C. § 120 to U.S. patent application Ser. No. 13/719,541, filed Dec. 19, 2012 which is a continuation in part of and claims priority benefit under 35 U.S.C. § 120 to U.S. patent application Ser. No. 13/114,099, filed May 24, 2011 and issued as U.S. Pat. No. 8,387,924 issued on Mar. 5, 2013, which is a divisional application of and claims priority benefit under 35 U.S.C. § 120 to U.S. patent application Ser. No. 12/201,062, filed Aug. 29, 2008 and issued as U.S. Pat. No. 8,025,257 on Sep. 27, 2011, which is a U.S. Utility Application of U.S. Provisional Application Ser. No. 60/992,746, filed Dec. 6, 2007 and to which priority benefit under 35 U.S.C. § 119(e) is claimed, and all of which are hereby incorporated by reference in their entirety; and 3) is a continuation in part of and claims priority benefit under 35 U.S.C. § 120 to U.S. patent application Ser. No. 14/728, 402, filed Jun. 2, 2015 which is a U.S. Utility Application of U.S. Provisional Patent Application Ser. No. 62/007,210, filed on Jun. 3, 2014 and Ser. No. 62/090,247, filed Dec. 10, 2014 and to which priority benefit under 35 U.S.C. § 119(e) is claimed, and all of which are hereby incorporated by reference in their entirety.

FIELD OF THE INVENTION

This invention relates to track roller bearing assemblies having split inner and/or outer races or one piece inner and/or outer races and having rolling elements or liners and, more particularly, to such track roller bearing assemblies used within an actuation system of a leading or trailing edge of a wing of an aircraft assembly, for example an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, or an Airbus A380 aircraft.

BACKGROUND

It is well known to use bearings to reduce friction between moving parts of a mechanical assembly. Similarly, it is well known to use bearings that roll on a fixed track to extend a first component from a second component. One implementation of such a track style bearing is within a wing of an aircraft. For example, fixed wing aircrafts typically include slats movably arranged along a leading or trailing edge of each wing and flaps movably arranged along a trailing edge of each wing. By selectively extending, retracting, and deflecting the slats and flaps, aerodynamic flow conditions on a wing are influenced so as to increase lift generated by the wing during takeoff or during landing. For example, during take-off the leading edge slats are moved forward to extend an effective chord length of the wing and improve lift. During flight, the leading edge slats and trailing edge flaps are placed in a retracted position to optimize aerodynamic conditions.

Generally speaking, leading edge slat and trailing edge flap designs employ a series of roller style bearings that guide fixed tracks to extend the leading edge slats and trailing edge flaps in order to increase lift at slow speed for landing and takeoff. The tracks may have multiple configurations such as, for example, general I-beam and PI-beam shapes. Since the tracks themselves are typically not overly robust in their construction, multiple load conditions may be realized by the track roller bearings. Similarly, side load rollers or pins typically slide against the track to assist in centering the main rollers on the track. The wing also includes actuation systems for positioning the slats and flaps. Actuation systems include, for example, drive motors (e.g., hydraulic or electric drive motors), drive shafts and other bearings such as spherical bearings, bushings and linkage bearings that assist in deployment and retraction of the slats and flaps. As can be appreciated, aircraft wing designs are being continually developed as engineers seek to improve aircraft performance while increasing system capabilities. Newer designs are tending to increase the number of systems employed within a wing cross section. Accordingly, space within the wing cross section is at a premium. Therefore, it is desirable to improve performance characteristics of components (e.g., to reduce maintenance) within the wing while also minimizing space needed for such components.

Based on the foregoing, it is the general object of this invention to provide an improved bearing for use in crucial applications.

SUMMARY OF THE INVENTION

The present invention resides in one aspect in a track roller assembly which includes a split inner and a plurality of rolling elements in rolling engagement with the split inner ring, the track roller assembly be disposed in a structure of an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, or an Airbus A380 aircraft.

There is also disclosed herein an actuation system for deploying and retracting a lift assisting device for an edge of a wing of an aircraft. The actuation system includes a track pivotally coupled to the lift assisting device, the track having first and second outer surfaces and side surfaces. The actuation system includes a shaft rotationally coupled within the wing of the aircraft and operable, in response to flight control signals, to deploy or retract the lift assisting device. The actuation system includes a mechanism for actuating the lift assisting device, coupled to the shaft, between a retracted position and a deployed position along an arcuate path. A plurality of track roller bearings rotatably contact the first and second outer surfaces of the track to guide the track along the arcuate path. The plurality of track roller bearings include one or more track roller assemblies having a split inner ring and a plurality of rolling elements in rolling engagement with the split inner ring.

There is also disclosed herein a track roller assembly that includes an outer ring comprising at least two pieces and a single piece inner ring positioned in the outer ring. The track roller assembly includes a plurality of rolling elements disposed between and in rolling engagement with the inner ring and the outer ring. In one embodiment, the track roller assembly being disposed in a structure of at least one of an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, and an Airbus A380 aircraft.

There is also disclosed herein an actuation system for deploying and retracting a lift assisting device of an edge of a wing of an aircraft. The actuation system includes a track pivotally coupled to the lift assisting device. The track has first and second outer surfaces and side surfaces. A shaft is rotationally coupled within the wing of the aircraft and operable, in response to flight control signals, to deploy or retract the lift assisting device. The actuation system includes an actuator coupled to the shaft, for actuating the lift assisting device between a retracted position to a deployed position along an arcuate path. The actuation system includes a plurality of track roller bearings rotatably contacting the first and second outer surfaces of the track to guide the track along the arcuate path. The plurality of track roller bearings include one or more track roller assembly having: 1) an outer ring comprising at least two pieces; 2) a single piece inner ring positioned in the outer ring; and 3) one or more rows of a plurality of rolling elements disposed between and in rolling engagement with the outer ring and the single piece inner ring.

BRIEF DESCRIPTION OF THE DRAWINGS

FIG. 4B is a cross-sectional view of a split type lined track roller bearing having a liner disposed on an inner surface of the outer ring, in accordance with one embodiment of the present invention;

FIG. 6E is a front, partial cross sectional view of a portion of the wing illustrating needle roller track roller bearings with two outer rings in accordance with one embodiment of the present invention;

FIG. 6F is a front, partial cross sectional view of a portion of the wing illustrating needle roller track roller bearings with a single piece outer ring and a single piece inner ring in accordance with one embodiment of the present invention;

FIG. 13 is a side, partial cross-sectional view of a wing of an aircraft illustrating one of the slat panels located at a leading edge of the wing and having split type needle track roller bearings assemblies and lined track roller assemblies.

DETAILED DESCRIPTION OF PREFERRED EMBODIMENTS OF THE INVENTION

Figure 1:
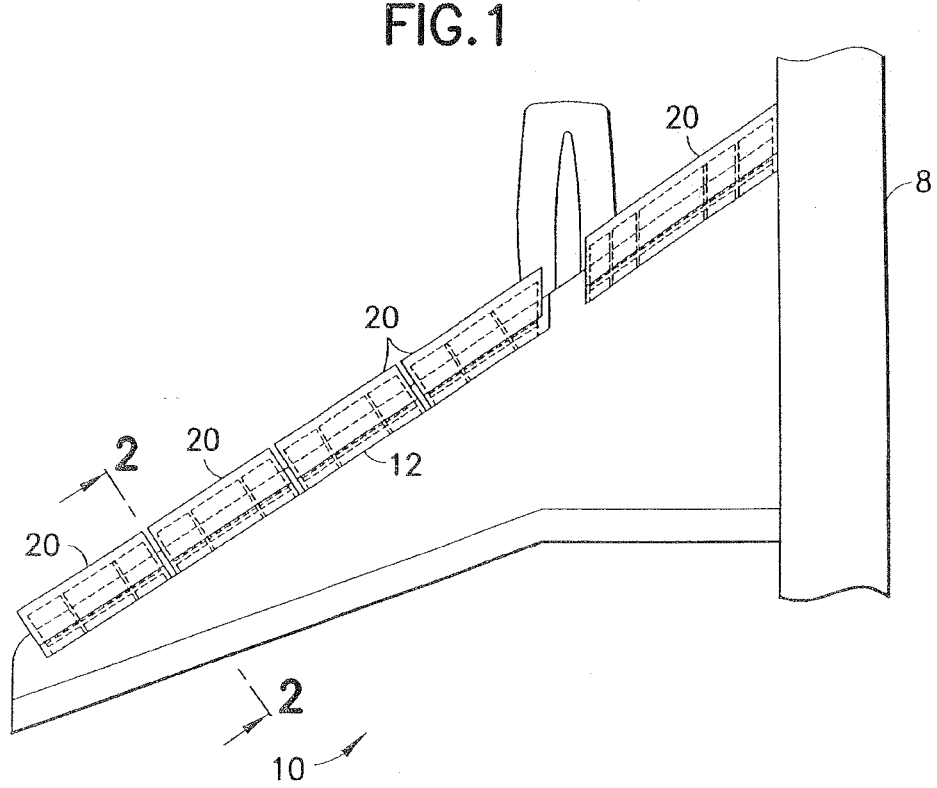
FIG. 1 is a plan view of a wing of an aircraft illustrating a plurality of slat panels located at a leading edge of the wing.

FIG. 1 provides a plan view of a leading edge section 12 of a wing 10 of an aircraft 8. The aircraft 8 is, for example, an aircraft other than a Boeing® aircraft such as, for example, an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, or an Airbus A380 aircraft.

One of Airbus's® is known as the Airbus® and A-350 ® aircraft. Airbus® and A-350 ® are registered trademarks of Airbus Corporation, having numerous registered trademarks therefor. The Airbus® and A-350 ® aircraft is defined by a wing planform—with a 64.7-meter wingspan, a total area of 442 square meters, and high swept leading edge. The Airbus® and A-350 ® aircraft includes a drop-hinge linkage mechanism to improve wing flap deployment kinetics, along with the introduction of a downwards movement for the upper wing spoilers to fill the gaps that occur when flaps are extended. In addition, the Airbus® and A-350 ® aircraft includes flight computer performs in-flight trimming of the inboard and outboard flaps, creating a variable camber wing that adapts to different flight conditions. In one embodiment, the Airbus® and A-350 ® aircraft employs 53 percent of composites (i.e., Carbon Fiber Reinforced Plastic) in the fuselage and wing to reduce the need for fatigue-related inspections required on more traditional aluminum jetliners. The Airbus® and A-350 ® aircraft has a seating capacity between 280-440. The Airbus® and A-350 ® aircraft has two engines (e.g., two Rolls-Royce Trent WB engines). The Airbus® and A-350 ® aircraft has a flying range of up to 7,950 nautical miles.

Figure 2:
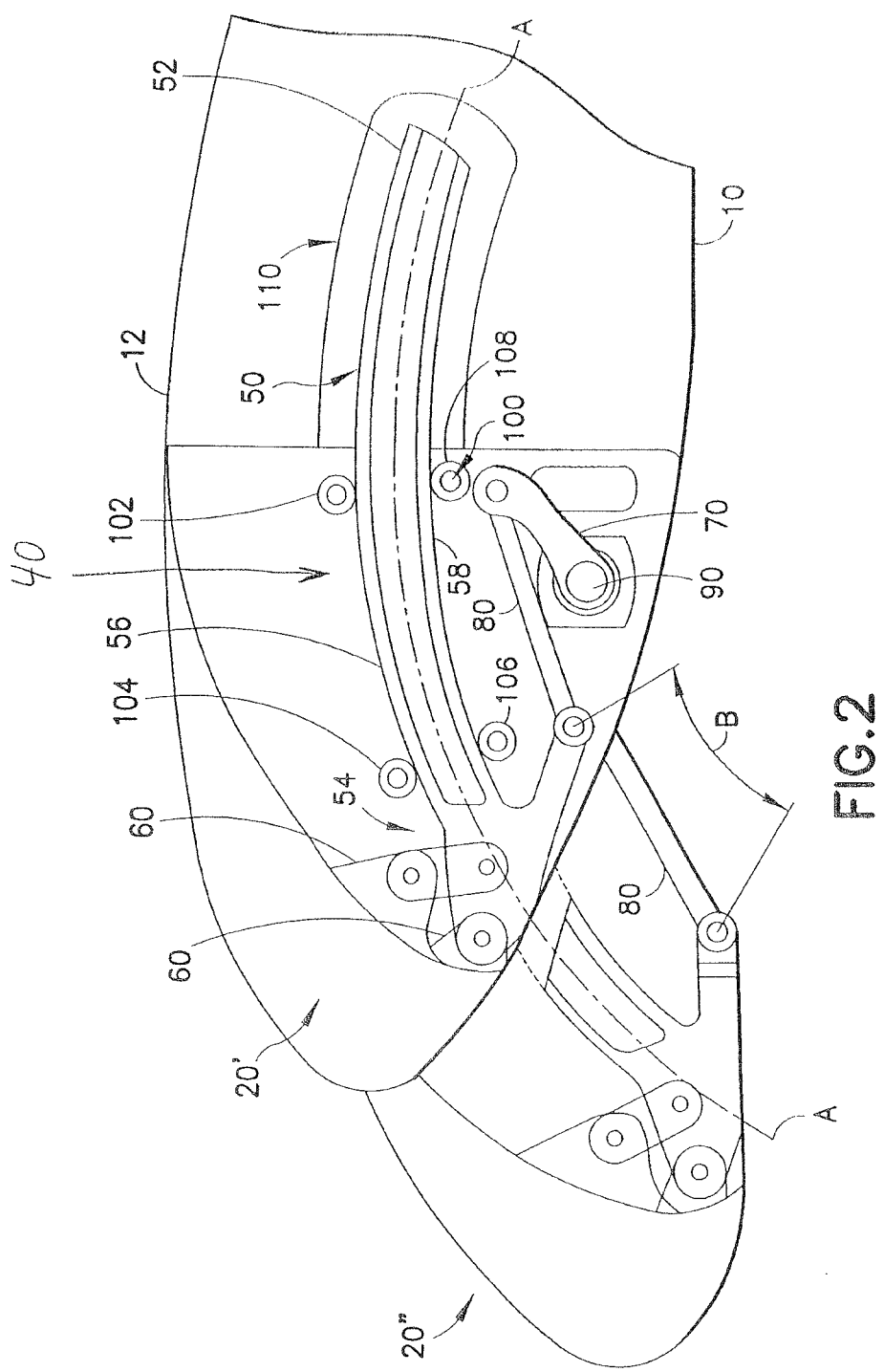
FIG. 2 is a side cross-sectional view of the wing of FIG. 1 taken along line 2-2 illustrating one of the slat panels in a deployed and a retracted position.

The wing 10 includes a plurality of slat panels 20 deployed along the leading edge 12 of the wing 10. As described herein, an actuation system selectively extends and retracts the slat panels 20 relative to the leading edge 12 in response to flight control signals, as is generally known in the art. FIG. 2 is a partial cross-sectional view of the wing 10 taken along line 2-2 of FIG. 1 and illustrates one of the leading edge slats 20 in a retracted position 20' and in an extended position 20". As shown in FIG. 2, in the retracted position (e.g., flight position) the slat 20' is located against the leading edge 12 of the wing 10 and in the deployed position (e.g., take-off and landing position) the slat 20" is deployed downwardly and forwardly away from the leading edge portion 12 of the wing 10 thus increasing a surface area of the wing 10 to vary the wing's lift-enhancing characteristics. Although a leading edge slat is shown and describes, the present invention relates also to trailing edge flaps, and the embodiments herein may be so altered without departing from the broader aspects of the present invention.

An actuation system 40 of each slat 20 includes a track 50 extending along an arcuate axis A from a rear portion 52 to a forward portion 54. It should be appreciated that the track 50 may have multiple configurations such as, for example, an I-beam shape and a PI-beam shape. Generally speaking, webbing that constitutes support elements of the track is not overly robust. As such, multiple load conditions are experienced at the track during operation that may be carried and distributed by roller style bearings, as are described herein, to, for example, the wing structure of the aircraft. The actuation system 40 is configured to be disposed in and operable with the aircraft 8, for example, aircraft other than Boeing® aircraft such as, for example, an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, or an Airbus A380 aircraft.

As shown in FIG. 2, the forward portion 54 of the track 50 is pivotally coupled to an interior surface of the slat 20. In one embodiment, the track 50 is coupled to the slat 20 by means of, for example, linkage bearings 60. The actuation system 40 also includes an actuator lever 70. The actuator lever 70 is coupled to the track 50 via an actuator arm 80. The actuator lever 70 is also coupled to a shaft 90. As is generally known in the art, the shaft 90 extends along the leading edge section 12 of the wing 10 and operates a plurality of actuator levers (similar to lever 70) coupled to respective ones of the plurality of slat panels 20 in response to flight control commands to extend the slats when rotating in a first direction and to retract the slats 20 when rotating in a second direction.

As shown in FIG. 2, a plurality of track roller bearings collectively designated 100 and individually marked 102, 104, 106 and 108, are disposed about a first outer surface 56 and a second outer surface 58 of the track 50. The track roller bearings 100 are in rotational contact with the outer surfaces 56 and 58 of the track 50 to guide the track 50 in its arcuate path along axis A during deployment and retraction. The path of travel of the slat 20 is illustrated in FIG. 2 by arrow B. As shown in FIG. 2, the plurality of track roller bearings 100 includes a first pair of track roller bearings 102 and 104 and a second pair of track roller bearings 106 and 108. It should be appreciated that it is within the scope of the present invention to include more or less than the illustrated two pairs of roller bearings. For example, three roller bearings may be disposed about one or both of the first outer surface 56 and/or second outer surface 58 of the track 50. As described in detail below, it is also within the scope of the present invention for the plurality of track roller bearings 100 to include rolling element needle style track rollers or self lubricating style track rollers. In one embodiment, a mounting web 110 encloses at least a portion of the track 50. In one embodiment, the mounting web 110 extends into a fuel tank disposed within the wing of the aircraft. The plurality of track rollers 100 are configured for use in the actuation system 40 that is configured for being disposed in and operable with the aircraft 8, for example, aircraft other than Boeing® aircraft such as, for example, an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, or an Airbus A380 aircraft.

Figure 3:
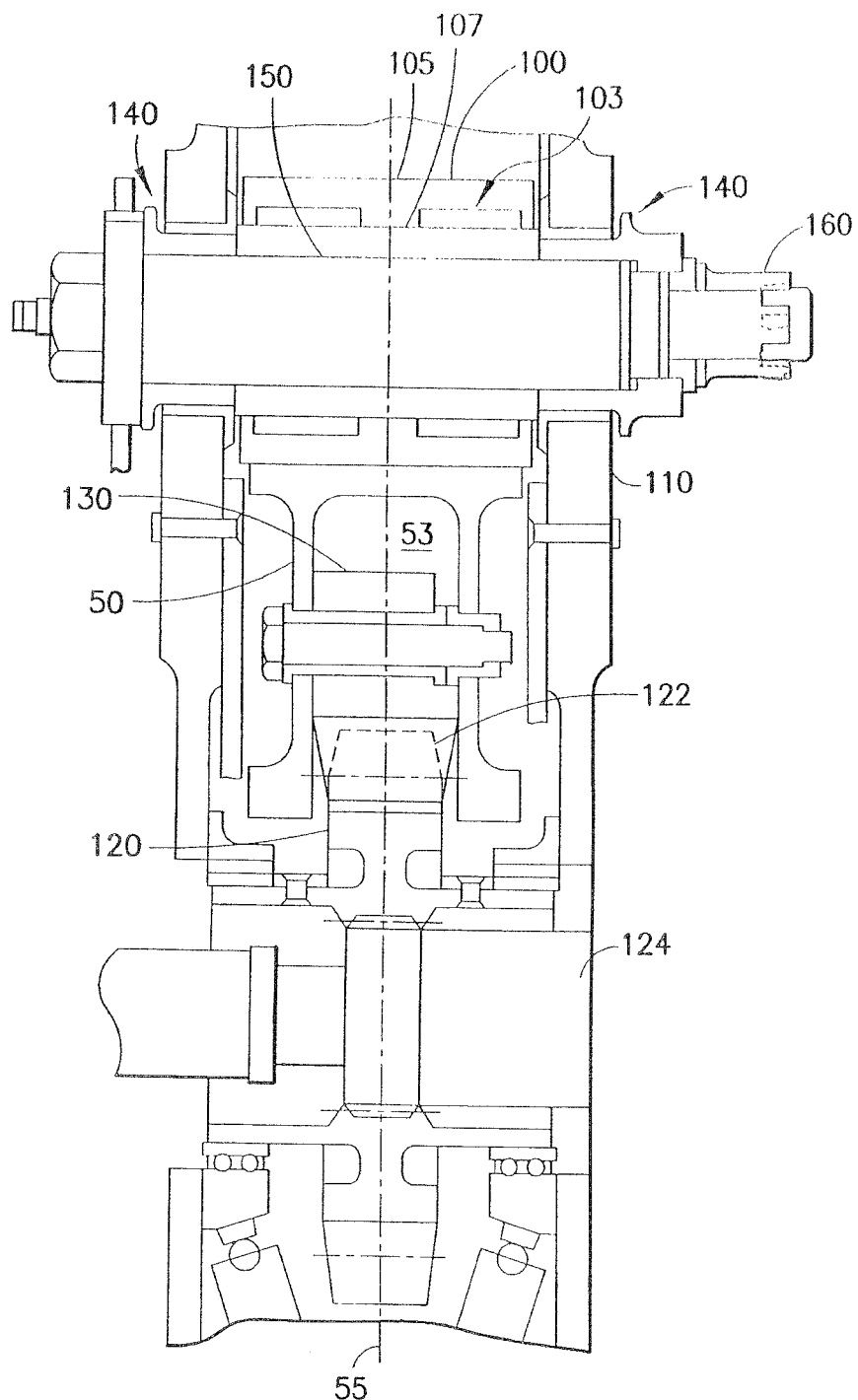
FIG. 3 is a front, partial cross-sectional view of a portion of the wing illustrating an actuation system for a slat panel, in accordance with one embodiment of the present invention.

In one embodiment illustrated in FIG. 3, the actuation system 40 includes a pinion gear 120 having teeth 122 that drive a gear track 130 disposed within an interior portion 53 of the track 50. Preferably, the gear track 130 is positioned on a vertical centerline 55 of the track 50. The pinion gear 120 is coupled to a shaft 124 (such as the shaft 90) that rotates in response to flight control commands. As the shaft 124 and the pinion gear 120 rotate, a drive force is provided to the gear track 130 for driving the track 50 along axis A between one of the retracted position 20' and the extended position 20" (FIG. 2). As shown in FIG. 3, the track roller bearing 100 is coupled to the mounting web 110 about the track 50. For example, as shown in FIG. 3, the track roller bearing 100 is coupled to the mounting web 110 above the track 50.

As shown in FIG. 2, the plurality of track roller bearings 100 are coupled to the mounting web 110 about the first and second outer surfaces 56 and 58 of the track 50 to support and guide the track 50 during deployment and retraction. In one embodiment, illustrated in FIG. 3, the track roller 100 is coupled to the mounting web 110 using opposing bushings 140, a mounting pin 150 and a nut 160. In one embodiment, the opposing bushings 140 are comprised of eccentric bushings and the nut 160 is comprised of a castellated nut to allow adjustment to the track 50 at fit-up. As shown in FIG. 3, the track roller bearing 100 includes a plurality of needle roller elements 103 (e.g., two rows of needle rollers in a double channel design). The needle roller elements 103 are lubricated with grease such as, for example, Aeroshell 33, Mobil 28, Aerospec 200 or Aeroplex 444 as is required by predetermined maintenance procedures. In one embodiment, an outer ring 105, an inner ring and 107 and needle rollers 103 of the track roller bearings 100 are comprised of hardened alloy steel such as, for example, 52100 or hardened stainless steel, such as, for example, 440C, 422 stainless with a special nitriding process (AeroCres®)(AEROCRES is registered trademark of RBC Aircraft Products, Inc., Oxford, Conn. USA), XD-15NW, and Cronidur 30.

Figure 4A:
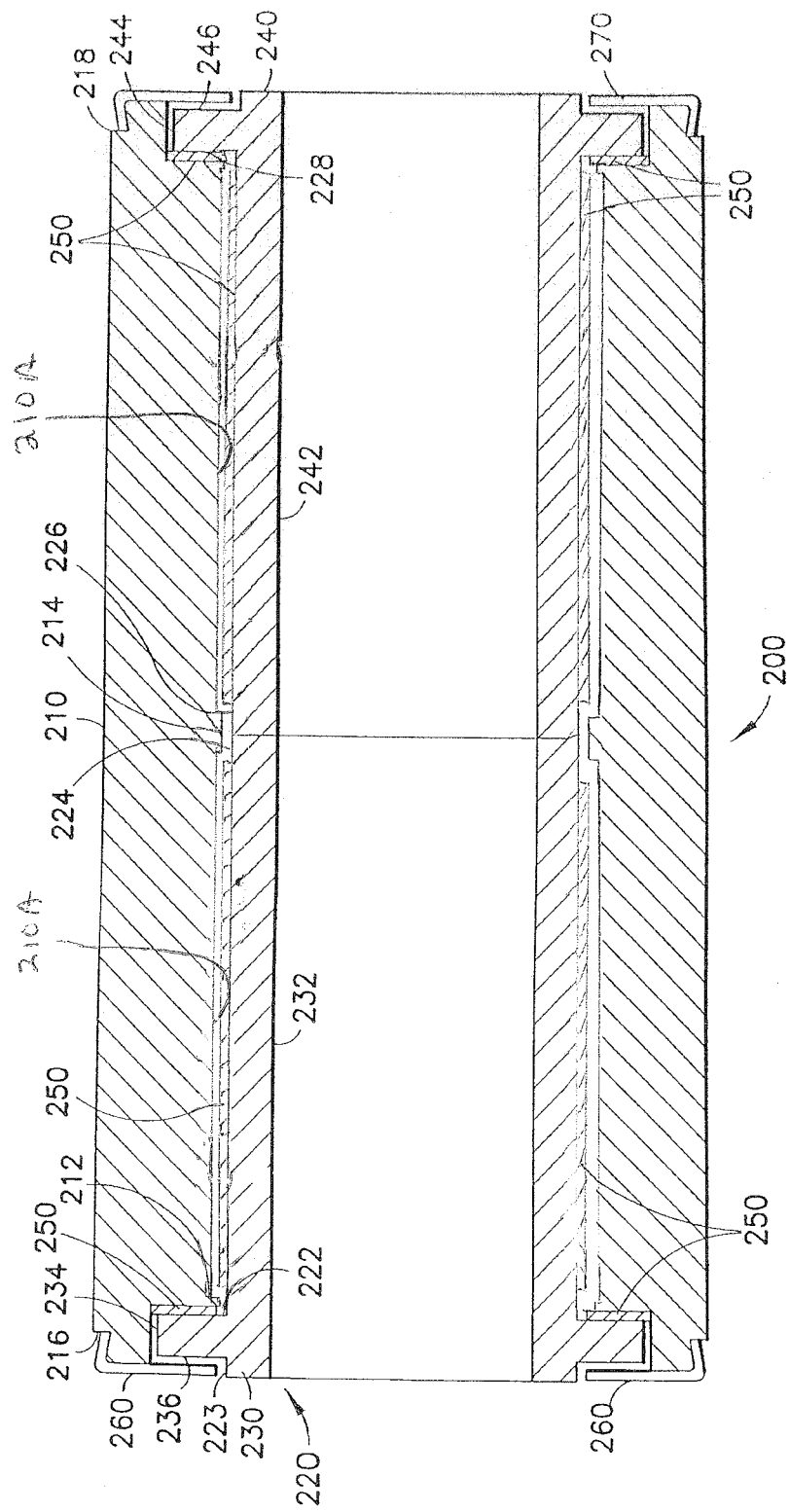
FIG. 4A is a cross-sectional view of a split type lined track roller bearing having a liner disposed on an outer surface of the inner ring, in accordance with one embodiment of the present invention.

In another embodiment, illustrated in FIG. 4A, the track roller bearing 100 is comprised of a lined track roller assembly 200 including an outer ring 210 and an inner ring 220. The inner ring 220 is a split ring including a first portion 230 and a second portion 240. The first portion 230 defines an exterior surface 224 and the second portion 240 defines an exterior surface 226. In one embodiment, the first portion 230 and the second portion 240 include respective body portions 232 and 242 as well as head portions 234 and 244. The head portions 234 and 244 include flanges 236 and 246, respectively. In accordance with the present invention, the split ring configuration of the first portion 230 and the second portion 240 due to their ability to deflect relative to one another, accommodate bending or moment loads and potential deflection and/or bending of the mounting pin 150 from stresses that may be encountered during, for example, aircraft takeoff and landing. As can be appreciated, unless accounted for, a bending of the mounting pin 150 may result in high friction or binding of the track roller 100 or 200 and a potential for damage to the track or track roller OD during deployment or retraction of the slats in response to flight control commands. The flanges 236 and 246 control axial motion of the outer ring 210 to substantially eliminate contact of the outer ring 210 and the opposing bushings 140 utilized to mount the track roller 100 and 200 within the mounting web 110.

As shown in FIG. 4A, the lined track roller assembly 200 may also include liners 250 disposed between bearing surfaces 210A, 212, 214 of the outer ring 210 and bearing surfaces 222, 224, 226 and 228 of the inner ring 220. As shown in FIG. 4A the liner 250 is secured to the surface 224 of the first portion 230 of the inner ring 220 and another liner 250 is secured to the surface 226 of the second portion 240 of the inner ring 220. In another embodiment, as illustrated in FIG. 4B the liner 250' is secured to the interior surface 210A of the outer ring 210. In one embodiment, the liners 250, 250' are constructed of polytetrafluoroethylene (commercially available under the designation TEFLON®)(TEFLON is a registered trademark of E.I. DuPont De Nemours and Company, Wilmington, Del. USA), polyester, graphite, fabric impregnated with a polymer, urethane, polyimide, epoxy, phenolic or other type of resin. In one embodiment, the liners 250 are molded and are comprised of polytetrafluoroethylene (TEFLON®), polyester, graphite, fibers in a thermosetting composite resin made from polyester, urethane, polyimide, epoxy, phenolic or other type of resin. In one embodiment, the outer ring 210 and the inner ring 220 is comprised of hardened alloy steel such as, for example, 52100 or hardened stainless steel, such as, for example, 440C, Custom 455®, Custom 465® (CUSTOM 455 and CUSTOM 465 are registered trademarks of CRS Holdings, Inc., Wilmington, Del., USA), and corrosion resistant steel such as 17-4PH, 15-5PH and PH13-8Mo.

In one embodiment, the lined track roller assembly 200 also includes shields 260 and 270 disposed about shoulder portions 216 and 218 of an outer diameter of the outer ring 210 and extending toward an outer diameter 223 of the inner ring 220. The inventors have discovered that the shields 260 and 270 reduce friction and discourage dust and other contaminates from entering and compromising contact between the bearing surfaces 212, 214 of the outer ring 210 and bearing surfaces 222, 224, 226 and 228 of the inner ring 220.

Figure 5:
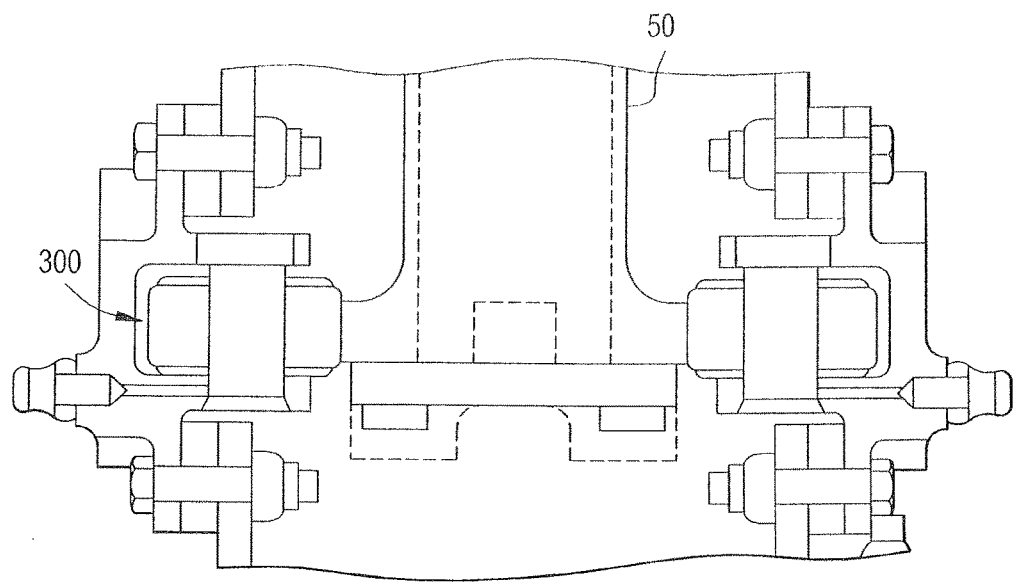
FIG. 5 is a front, partial cross-sectional view of a portion of the wing illustrating side guide roller bearings in accordance with one embodiment of the present invention.

In one embodiment, illustrated in FIG. 5, a plurality of side guide roller bearings 300 are disposed about opposing sides of the track 50. The side guide roller bearings 300 are in rotational contact with the opposing side surfaces of the track 50 to guide the track 50, along with track roller bearings 100 and 200, in its arcuate path along axis A during deployment and retraction. In one embodiment, the plurality of side guide roller bearings 300 are in rotational contact with the track 50. In one embodiment, the plurality of side guide roller bearings 300 include needle roller bearings having outer races, inner races and needle rollers constructed of hardened alloy steel such as, for example, 52100 or hardened stainless steel such as, for example, 440C, 52100, 422 stainless with a special nitriding process (e.g., the aforementioned AeroCres® process), XD-15NW, and Cronidur 30. In yet another embodiment, the side guide roller bearings 300 include end washers and seals. The end washers are constructed of, for example, 52100 steel with cadmium or zinc nickel plating or 420 stainless steel. The seals are made from a thermoplastic such as, for example, an acetal copolymer with lubricant fillers or Delrin®/Celcon® (DELRIN is a registered trademark of E.I. DuPont De Nemours and Company, Wilmington, Del. USA, and CELRON is a registered trademark of CNA Holdings, Inc., Summit, N.J. USA). The seals retain grease and prevent of ingress dirt, dust and other contaminates into the bearings 300. In one embodiment, needle roller elements of the bearings 300 are lubricated with grease such as, for example, Aeroshell 33, Mobil 28, Aerospec 200 or Aeroplex 444 as is required by predetermined maintenance procedures.

As described above, both the rolling element track bearings 100 and self lubricating track roller bearings 200 include a hard outer ring or race to work in harmony with the mating track 50 that the bearings roll against. In one embodiment, the track 50 is made of titanium or steel. In one embodiment, the track 50 may be coated with a material such as, for example, tungsten carbide, although a coating is not a requirement of the present invention.

In addition to a unique bearing mounting configuration, another aspect of the present invention is related to the materials from which the bearings are manufactured. Historically, lined track bearings are manufactured from relatively soft materials. For example, inner rings are typically comprised of precipitation-hardening martensitic stainless steel such as, for example, 17-4PH steel, having a Rockwell hardness in a range of about HRc 30s to about HRc 40s, while outer rings are typically comprised of precipitation-hardening stainless steel such as, for example, custom 455 steel, having a Rockwell hardness in the range of about HRc 40s. Outer rings may also be manufactured as through hardened high strength steel having a Rockwell hardness of in the range of about HRc 50s to avoid flats that can occur. 440C steel has also been used for outer rings. The inventors have discovered that, in certain applications, it is beneficial to maintain inner rings manufactured from 17-4PH steel, and that it is desirable to manufacture outer rings of AISI Type 422 stainless steel. In one embodiment, each of the outer rings is comprised of AISI Type 422 stainless steel with a special nitriding hardening process (e.g., the aforementioned AeroCres® process). Outer rings comprised of AISI Type 422 stainless steel with AeroCres® hardening are preferred for superior corrosion resistance and performance as compared to conventional outer rings manufactured of 440C steel.

Figures 6B, 6C:
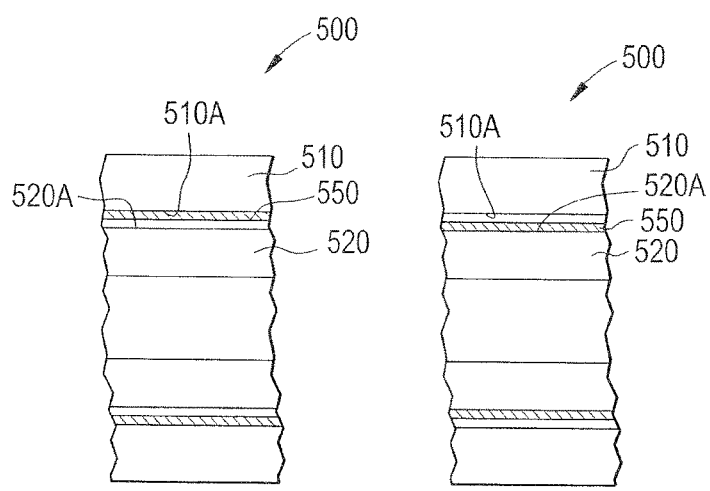
FIG. 6B is an enlarged view of one embodiment of the lined track roller of the present invention.
FIG. 6C is an enlarged view of another embodiment of the lined track roller of the present invention.
Figure 6A:
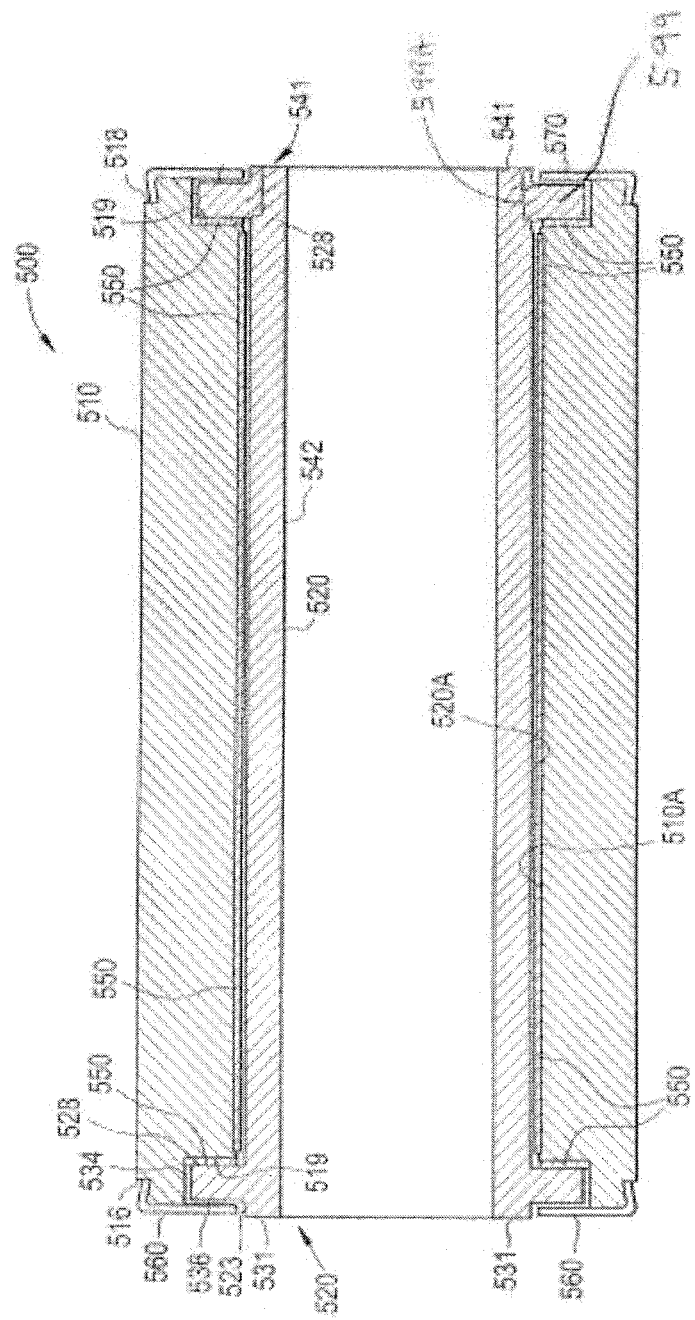
FIG. 6A is a cross-sectional view of a lined track roller bearing in accordance with one embodiment of the present invention.

In another embodiment, illustrated in FIG. 6A, the lined track roller bearing 500 is similar to the track roller bearing of FIGS. 4A and 4B, thus like elements have been assigned similar element numbers with the first numeral 2 being replaced with the numeral 5. The lined track roller bearing 500 is a lined track roller assembly 500 including an outer ring 510 and an inner ring 520. The inner ring 520 is disposed at least partially in the outer ring 510. The inner ring 520 defines an area of engagement 599A (e.g., a bore) that engages a washer 599 to allow the outer ring 510 to be slid over the inner ring 520 and to axially retain the inner ring 520 relative to the outer ring 510. The washer 599 is slip fit or press fit onto the area of engagement 599A of the inner ring 520 and/or is welded to the inner ring 520. The outer ring 510 defines an inner bearing surface 510A and the inner ring 520 defines an outer bearing surface 520A. The inner ring 520 extends continuously from a first end 531 to a second end 541. Thus the lined track roller bearing 500 has no split and no separate first portion 230 and second portion 240, as shown in FIGS. 4A and 4B. The inner ring 520 defines a continuous body portion 542 as well as head portion 534 proximate the first end 531. The head portions 534 and 544 include flange 536, respectively. The flange 536 and the washer 599 control axial motion of the outer ring 510 to substantially eliminate contact of the outer ring 510 with the opposing bushings 540 utilized to mount the track roller 500 within the mounting web 310, illustrated in FIG. 7. While the lined track rollers 500 are shown and described as having no split and no separate first portion 230 and second portion 240, the present invention is not limited in this regard, as the lined track rollers 500 having a split configuration as shown in FIGS. 4A and 4B may also be employed without departing from the broader aspects defined herein.

As shown in FIGS. 6A and 6B, the lined track roller assembly 500 includes liners 550 disposed between the outer ring 510 the inner ring 520. As shown in FIGS. 6A and 6B, the liner 550 is disposed on, for example, secured to (e.g., by an adhesive or by bonding) the inner bearing surface 510A of the outer ring 510 and the liner 550 slidingly engages the outer bearing surface 520A of the inner ring 520. A liner 550 is also disposed between an inside facing lateral surface 528 of the each of the head portions 534 and 544 and an outwardly facing lateral surface 519 of the outer ring 510. The lined track roller assembly 500 also includes shields 560 and 570 disposed about shoulder portions 516 and 518 of an outer diameter of the outer ring 510 and extending to an outer diameter 523 of the inner ring 520. The liners 550 are manufactured from materials similar or identical to those described above for the liners 250. While the liner 550 is shown in FIGS. 6A and 6B and described as being disposed on the inner bearing surface 510A, the present invention is not limited in this regard as the liner 550 may be disposed on the outer bearing surface 520A of the inner ring 520 and the liner 550 slidingly engages the inner bearing surface 510A of the outer ring 510, as shown in FIG. 6C.

Figure 6D:
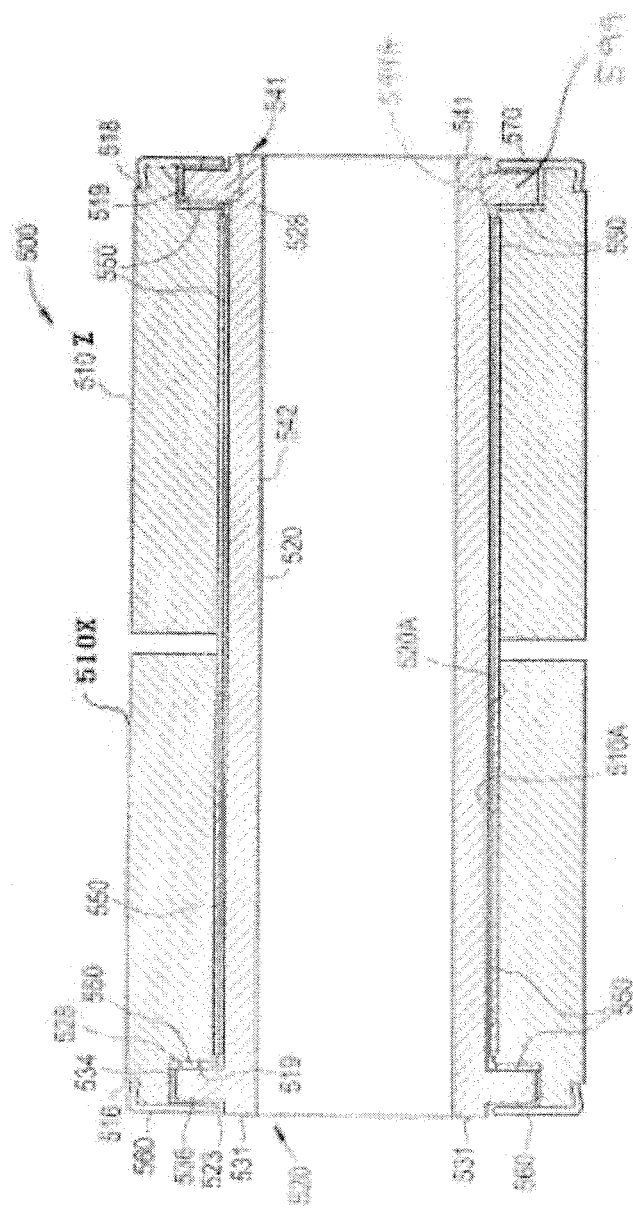
FIG. 6D is a front, partial cross-sectional view of a portion of the wing illustrating lined track roller bearings with two outer rings in accordance with one embodiment of the present invention.

In one embodiment, as shown in FIG. 6D, the lined track roller bearing 500 is similar to the track roller bearing of FIGS. 4A and 4B, thus like elements have been assigned similar element numbers with the first numeral 2 being replaced with the numeral 5. The lined track roller bearing 500 is a lined track roller assembly 500 including two outer rings 510X and 510Z and a single piece inner ring 520. The inner ring 520 is disposed at least partially in the outer rings 510X and 510Z. The inner ring 520 defines an area of engagement 599A (e.g., a bore) that engages a washer 599 to allow the outer rings 510X and 510Z to be slid over the inner ring 520 and to axially retain the inner ring 520 relative to the outer rings 510X and 510Z. The washer 599 is slip fit or press fit onto the area of engagement 599A of the inner ring 520 and/or is welded to the inner ring 520. The outer ring 510 defines an inner bearing surface 510A and the inner ring 520 defines an outer bearing surface 520A. The inner ring 520 extends continuously from a first end 531 to a second end 541. Thus, the inner ring 520 of the lined track roller bearing 500 has no split. The inner ring 520 defines a continuous body portion 542 as well as head portion 534 proximate the first end 531 and the second end 541, respectively. The head portions 534 and 544 include flange 536. The flange 536 and washer 599 control axial motion of the outer rings 510X and 510Z, respectively, to substantially eliminate contact of the outer ring 510 with the opposing bushings 540 utilized to mount the track roller 500 within the mounting web 310, illustrated in FIG. 7. While two outer rings 510X and 510Z are shown and described, the present invention is not limited in that regard, as any suitable number of outer rings may be employed to the same effect.

In one embodiment, as shown in FIG. 6E, the needle roller bearing 500 is similar to the track roller bearing of FIGS. 4A and 4B, thus like elements have been assigned similar element numbers with the first numeral 2 being replaced with the numeral 5. The needle roller bearing 500 track roller assembly includes two outer rings 510X and 510Z (e.g., a two piece axially split outer ring) and a single piece inner ring 520. The inner ring 520 is disposed at least partially in the outer rings 510X and 510Z. The inner ring 520 defines an area of engagement 599A (e.g., a bore) that engages a washer 599 to allow the outer rings 510X and 510Z to be slid over the inner ring 520 and to axially retain the inner ring 520 relative to the outer rings 510X and 510Z. The washer 599 is slip fit or press fit onto the area of engagement 599A of the inner ring 520 and/or is welded to the inner ring 520. The outer ring 510 defines an inner bearing surface 510A and the inner ring 520 defines an outer bearing surface 520A. The inner ring 520 extends continuously from a first end 531 to a second end 541. Thus the lined needle roller bearing 500 has shoulders 510Q and 510Q' separating needle rollers 551A from needle rollers 551B by a gap G, each needle roller being housed in rows of needle rollers 551 and 551', respectively. The inner ring 520 defines a continuous body portion 542 as well as head portion 534 proximate the first end 531, respectively. The head portion 534 includes flange 536. The flange 536 and the washer 599 control axial motion of the outer ring 510 to substantially eliminate contact of the outer ring 510 with the opposing bushings 540 utilized to mount the track roller 500 within the mounting web 310, illustrated in FIG. 7. While two rows of needle rollers 551 and 551' are shown and described, the present invention is not limited in this regard, as any suitable number of rows of needle rollers may be employed to the same effect.

Figure 10:
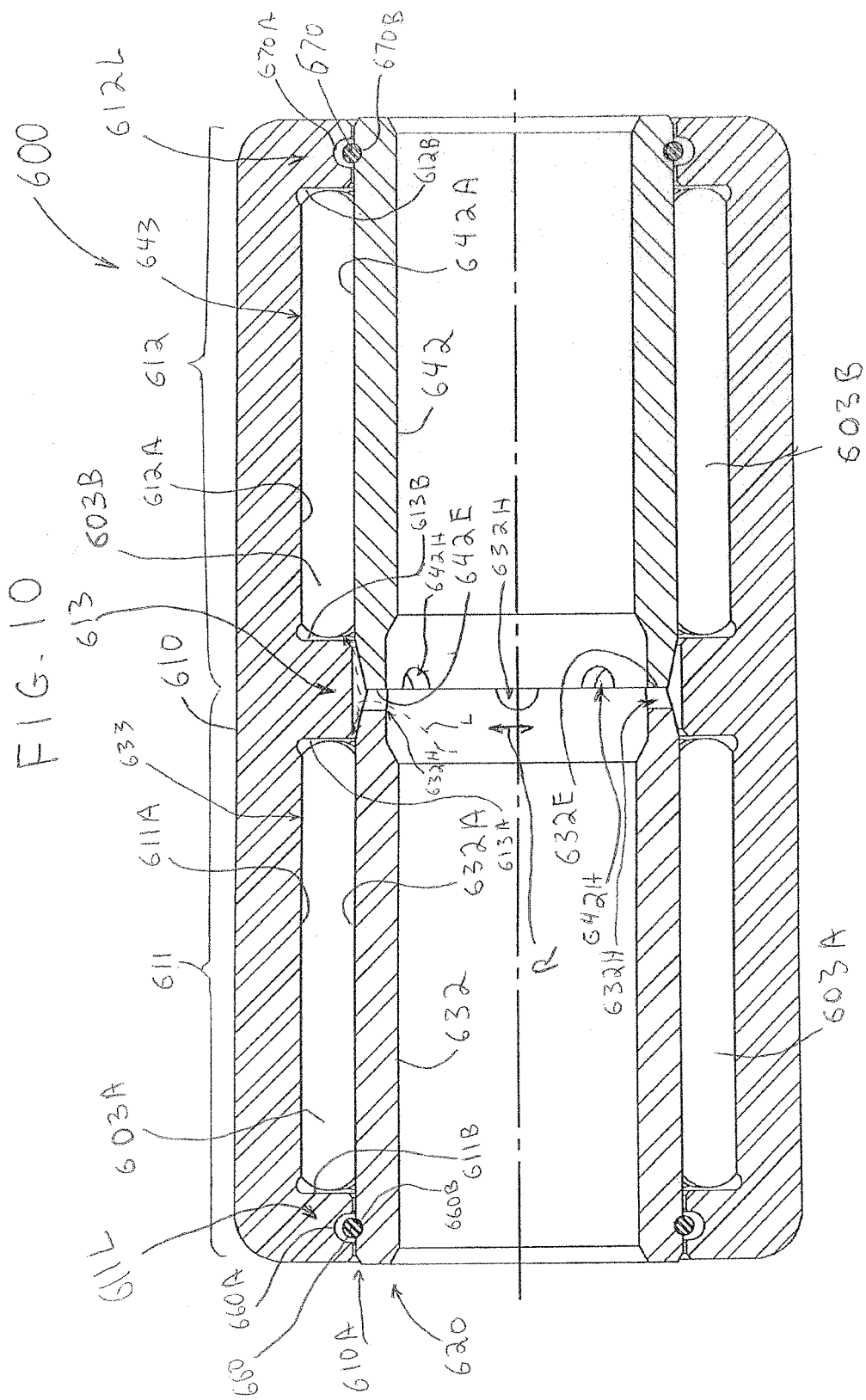
FIG. 10 is a cross-sectional view of a split type needle track roller bearing in accordance with one embodiment of the present invention.

In one embodiment, as shown in FIG. 6F, the needle roller bearing 1500 is similar to the track roller bearing of FIGS. 6E and 10, thus like elements have been assigned similar element numbers as employed for FIG. 6E. The needle roller bearing 1500 track roller assembly includes a single piece outer ring 510 having two sections 510X and 510Z integral with one another and a single piece inner ring 520. The inner ring 520 is disposed at least partially in the outer ring 510. The inner ring 520 defines an area of engagement 599A (e.g., a bore) that engages a washer 599 to allow the outer ring 510 to be slid over the inner ring 520 and to axially retain the inner ring 520 relative to the outer ring 510. The washer 599 is slip fit or press fit onto the area of engagement 599A of the inner ring 520 and/or is welded to the inner ring 520. The outer ring 510 defines an inner bearing surface 510A and the inner ring 520 defines an outer bearing surface 520A. The inner ring 520 extends continuously from a first end 531 to a second end 541. Thus the needle roller bearing 1500 has a shoulder 510Q separating needle rollers 551A from needle rollers 551B the needle rollers 551A and 551B being housed in rows of needle rollers 551 and 551', respectively. The inner ring 520 defines a continuous body portion 542 as well as head portion 534 proximate the first end 531, respectively. The head portion 534 includes flange 536. The flange 536 and the washer 599 control axial motion of the outer ring 510 to substantially eliminate contact of the outer ring 510 with the opposing bushings 540 utilized to mount the track roller 1500 within the mounting web 310, illustrated in FIG. 7. While two rows of needle rollers 551 and 551' are shown and described, the present invention is not limited in this regard, as any suitable number of rows of needle rollers may be employed to the same effect.

Figure 7:
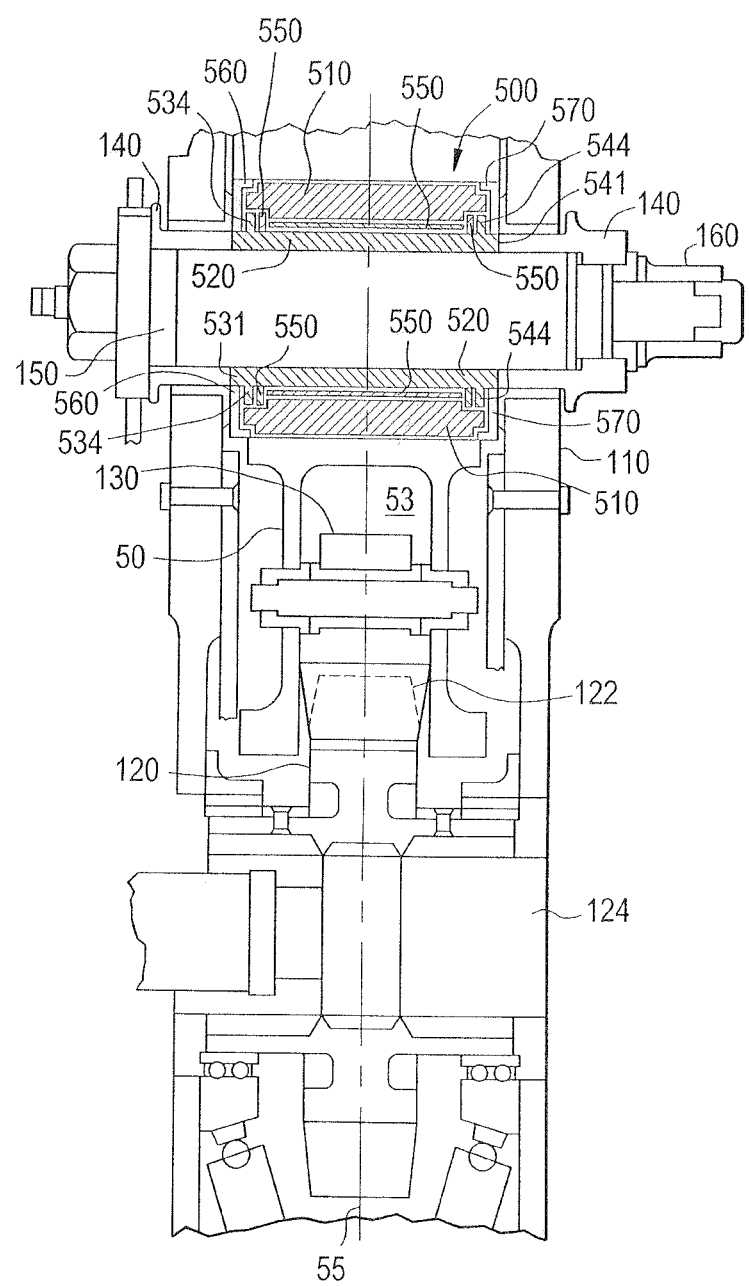
FIG. 7 is a cross-sectional view of a lined track roller bearing in accordance with one embodiment of the present invention.

The mounting web 110 of FIG. 7 is similar to the mounting web of FIG. 3; therefore like elements for the track roller bearing 500 have been assigned similar element numbers with the first numeral 2 being replaced with the numeral 5. As shown in FIG. 7, the track roller bearing 500 is coupled to the mounting web 110 above the track 50. With reference to FIG. 1, one or more of the track roller bearings 102, 104, 106 and 106 are lined track rollers 500 as illustrated in FIG. 5. The lined track roller 500 is coupled to the mounting web 110 using opposing bushings 140, a mounting pin 150 and a nut 160.

Figure 8:
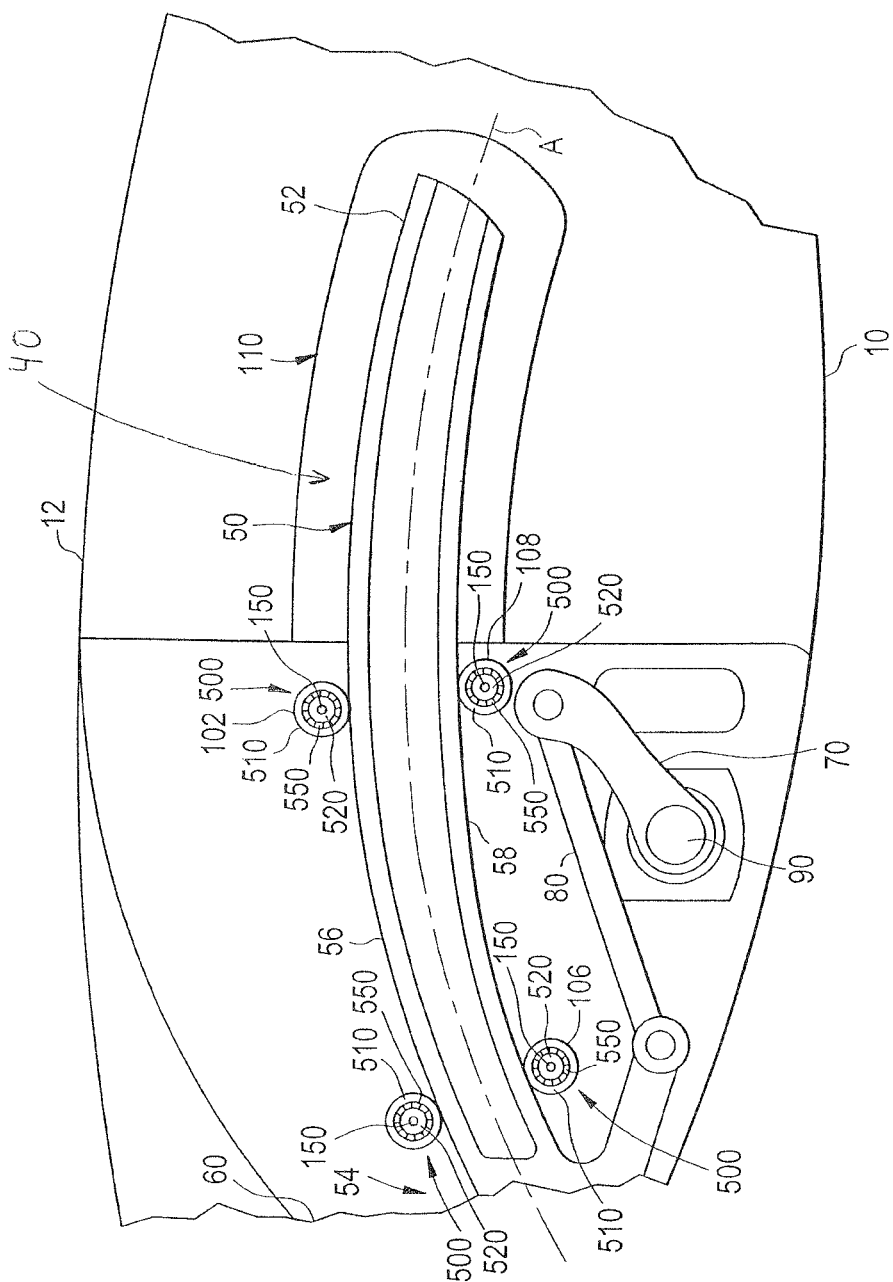
FIG. 8 is a side, partial cross-sectional view of a wing of an aircraft illustrating one of the slat panels located at a leading edge of the wing and having lined track roller bearings assemblies.

Referring to FIG. 8, in one embodiment, all of the track roller bearings 102, 104, 106 and 108 are lined track rollers 500 similar to those as illustrated in detail in FIGS. 6A, 6B and 6C.

Figure 9:
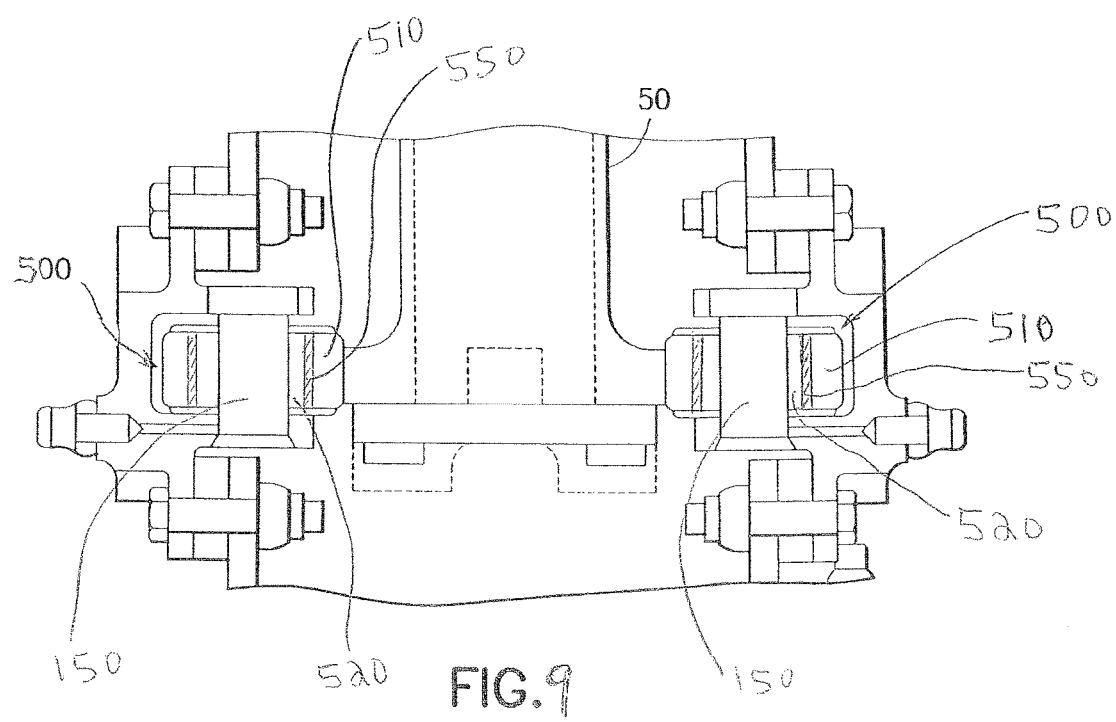
FIG. 9 is a front, partial cross-sectional view of a portion of the wing illustrating lined side guide roller bearings in accordance with one embodiment of the present invention.

Referring to FIG. 9, the plurality of side guide roller bearings 500 are disposed about opposing sides of the track 50 in a manner similar to that described above with reference to the side guide track roller 300 of FIG. 5. However, one or more of the side guide roller bearings 500 are lined roller bearings similar to the lined track roller bearings 500 shown in FIGS. 6A, 6B and/or 6C. In one embodiment, all of the side guide roller bearings 500 are lined roller bearings similar to the lined track roller bearings 500.

Surprisingly, use of the lined track rollers 500 in the actuation system of leading edge flaps on an aircraft may have benefit over bearings having needle rollers. Actuation systems are limited as to how much force they can apply. Since lined track rollers have a higher friction coefficient than needle roller track rollers, one skilled in the art of bearing design for aircraft applications would be discouraged from using a system that includes lined track rollers as it will take more force to actuate the system. However, one surprising benefit of lined track rollers is to move away from track rollers that require grease. By moving away from rollers that require grease, heavy hydraulic greasing systems do not have to be included on the aircraft and this benefit of reduced weight and complexity has been discovered to overcome the determinant of higher friction compared to the lower friction needle rollers.

As shown in FIG. 10, a track roller assembly is generally designated by the numeral 600. The track roller assembly 600 is a split type track roller assembly having a split inner ring 620 defined by a first section 632 and a second section 642. The first section 632 defines a radially outward facing bearing surface 632A. The second section 642 defines a radially outward facing bearing surface 642A. The first section defines an axial end surface 632E. The second section defines an axial end surface 642E that abuts the axial end surface 632E. The first section 632 includes a plurality of passages 632H extending therethrough and located proximate the axial end surface 632E. The second section 642 includes a plurality of passages 642H extending therethrough and located proximate the axial end surface 642E. The passages 632H and 642H provide a path as indicated by the dashed line arrow L for a lubricant such as grease to be supplied to two cavities 633 and 642 as described further herein.

As shown in FIG. 10, the split inner ring 620 is positioned in an interior area 610A defined by an outer ring 610. The outer ring 620 defines a first section 611 and a second section 612. The first section 611 defines a first shoulder 611L that extends radially inward from an inwardly facing bearing surface 611A of the first section 611. The first shoulder 611L is located proximate an axial end of the outer section 611. The first shoulder 611L defines a first retaining surface 611B that faces axially inward. The second section 612 defines a second shoulder 612L that extends radially inward from an inwardly facing bearing surface 612A of the second section 612. The second shoulder 612L is located proximate an axial end of the outer section 612. The second shoulder 612L defines a second retaining surface 612B that faces axially inward.

As shown in FIG. 10, the first section 611 and the second section 612 of the outer ring 610 share a common third shoulder 613 that extends radially inward from the inwardly facing bearing surface 611A and the inwardly facing bearing surface 612A. The third shoulder 613 defines a third retaining surface 613A that faces axially outward toward the first retaining surface 611B. The third shoulder 613 defines a fourth retaining surface 613B that faces axially outward toward the second retaining surface 612B.

As illustrated in FIG. 10, the radially outward facing bearing surface 632A, the inwardly facing bearing surface 611A, the first retaining surface 611B and the third retaining surface 613A define the cavity 633 therebetween. A plurality of rolling elements 603A (e.g., needle rollers) are contained in the cavity 633 and rollingly engage the radially outward facing bearing surface 632A and the inwardly facing bearing surface 611A. The plurality of rolling elements 603A are retained axially by the first retaining surface 611B and the third retaining surface 613A. The passages 632H provide a path L for a lubricant to be supplied to the plurality of rolling elements 603A.

As illustrated in FIG. 10, the radially outward facing bearing surface 642A, the inwardly facing bearing surface 612A, the second retaining surface 612B and the fourth retaining surface 613B define the cavity 643 therebetween. A plurality of rolling elements 603B (e.g., needle rollers) are contained in the cavity 643 and rollingly engage the radially outward facing bearing surface 642A and the inwardly facing bearing surface 612A. The plurality of rolling elements 603B are retained axially by the second retaining surface 612B and the fourth retaining surface 613B. The passages 642H provide a path L for a lubricant to be supplied to the plurality of rolling elements 603B.

The first section 632 of the inner ring 620 and the second section 642 of the inner ring 620 are radially deflectable relative to each other in a direction defined by an arrow R in response to loads applied thereto. Thus, the first section 632 and the second section 642 are radially movable relative to one another and the axial end surface 632E slides along the axial end surface 642E.

In one embodiment, as illustrated in FIG. 10, the track roller assembly 600 also includes snap rings 660 and 670 for retaining the outer ring 610 to the inner ring 620. The snap ring 660 is seated in a grove 660B formed in the first section 632 of the inner ring 620. A portion of the snap ring 660 extends into a groove 660A formed in the first section 611 of the outer ring 610. The snap ring 670 is seated in a grove 670B formed in the second section 642 of the inner ring 620. A portion of the snap ring 670 extends into a groove 670A formed in the second section 612 of the outer ring 610. The snap rings 660 and 670 are configured to keep the bearing assembled during shipment and handling, facilitate easy assembly into position on the slat, and discourage dust and other contaminates from entering the cavities 633 and 643.

Figure 11:
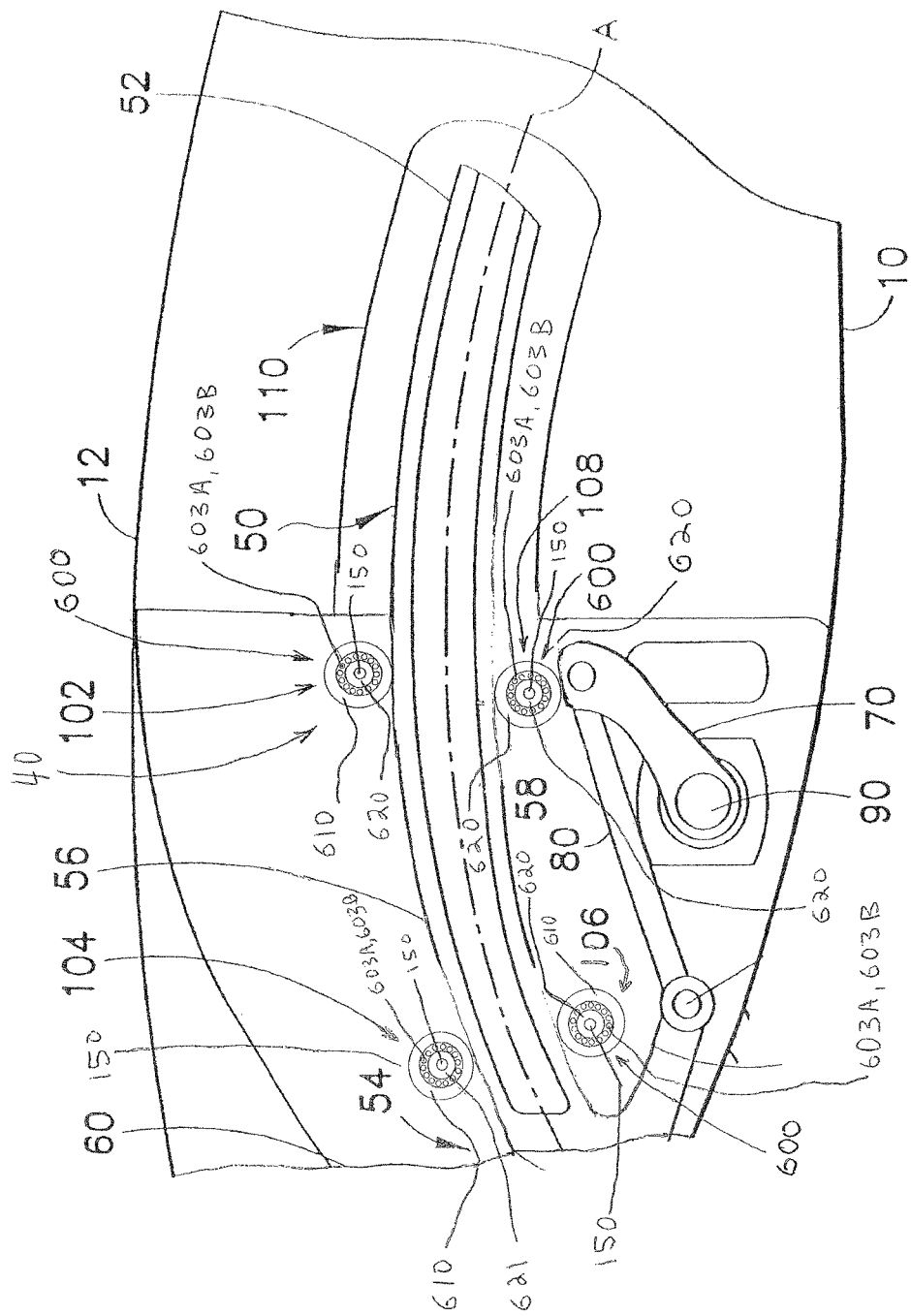
FIG. 11 is a side, partial cross-sectional view of a wing of an aircraft illustrating one of the slat panels located at a leading edge of the wing and having split type needle track roller bearings assemblies.

Referring to FIG. 11, in one embodiment, all of the track roller bearings 102, 104, 106 and 108 are split type track roller assemblies 600 with the plurality of the rolling elements 603A and 603B therein similar to those as illustrated in detail in FIG. 10.

Figure 12:
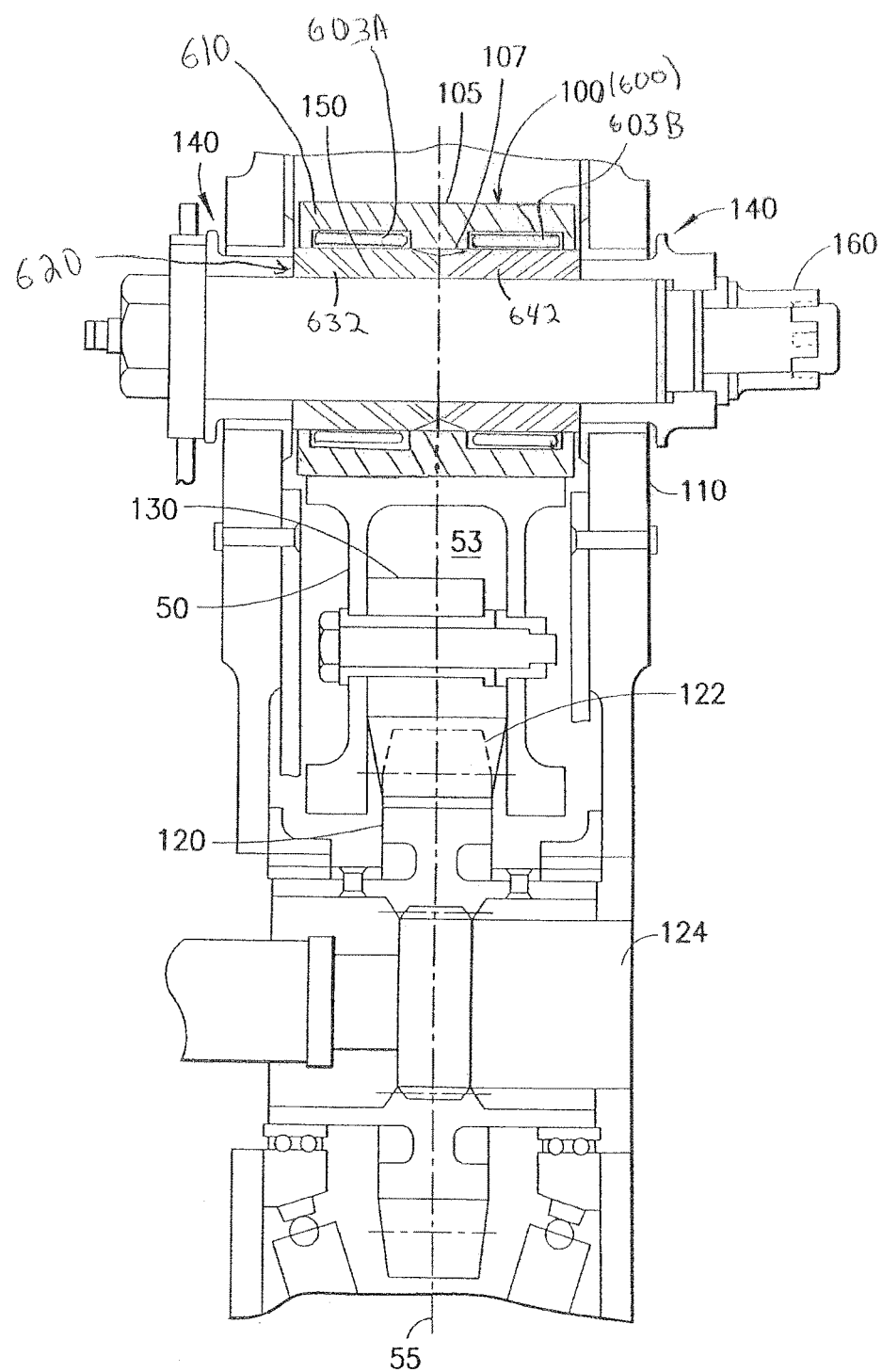
FIG. 12 is a front, partial cross-sectional view of a portion of the wing illustrating an actuation system for a slat panel, and illustrating a track roller assembly comprising a split inner ring and a plurality of rolling elements in rolling engagement with the split inner ring.

Referring to FIG. 12, the track roller bearing 600 is coupled to the mounting web 110 above the track 50. The split type track roller assembly 600 is coupled to the mounting web 110 using opposing bushings 140, a mounting pin 150 and a nut 160.

Referring to FIG. 13, in one embodiment, the track roller bearings 102 and 108 are split type track roller assemblies assemblies 600 with the plurality of the rolling elements 603A and 603B therein similar to those as illustrated in detail in FIG. 10, and track roller bearings assemblies 104 and 106 are lined track bearing assemblies as illustrated in detail in FIGS. 4A and 4B and/or FIG. 6A.

The outer ring 610, the inner ring 620 and the plurality of rolling elements 603A and 603B are manufactured from any of the materials in any combination as described herein. In one embodiment, the outer ring 610, the inner ring 620 and the plurality of rolling elements 603A and 603B are manufactured from AMS5925 (XD15NW™).

In one embodiment, the rolling elements 603A and 603B are manufactured from a CREN material. In one embodiment, the CREN material is Cronidur 30®. In one embodiment, the CREN material is XD15NW®. In one embodiment, the CREN material is 422 Stainless Steel.

In one embodiment, the inner ring 620 is manufactured from a CREN material. In one embodiment, the CREN material is Cronidur 30®. In one embodiment, the CREN material is XD15NW®. In one embodiment, CREN material is 422 Stainless Steel.

In one embodiment, the outer ring 610 is manufactured from CREN material. In one embodiment, the CREN material is Cronidur 30®. In one embodiment, the CREN material is XD15NW®. In one embodiment, CREN material is 422 Stainless Steel.

In one non-limiting embodiment, XD15NW® includes between 0.37 and 0.45 percent by weight carbon, up to 0.60 percent by weight silicon, up to 0.60 percent by weight manganese, between 15.00 and 16.5 percent by weight chromium, between 1.50 and 1.90 percent by weight molybdenum, between 0.20 and 0.40 percent by weight vanadium, between 0.16 and 0.25 percent by weight nitrogen and up to 0.30 percent by weight nickel.

In one non-limiting embodiment, Cronidur 30® includes between 0.25 and 0.35 percent by weight carbon, up to 1.00 percent by weight silicon, up to 1.00 percent by weight manganese, between 14.00 and 16.00 percent by weight chromium, up to 0.50 percent by weight nickel, between 0.85 and 1.10 percent by weight molybdenum and between 0.30 and 0.50 percent by weight nitrogen.

In one embodiment, the outer ring 610, the inner ring 620 and the rolling elements 603A and 603B are manufactured from a CRES material, for example, a 440C stainless steel (AMS5630, AMS5618, AMS5880, AMS5923). In another embodiment, the outer ring 610, the inner ring 620, and the rolling elements 603 and 603B are manufactured from a hardened alloy steel, for example, 52100. In this case, the outer diameter and end faces of the outer ring are chrome plated to enhance corrosion resistance.

In one non-limiting embodiment, 440C stainless steel includes 0.95-1.20 percent by weight carbon, up to 1.00 percent by weight silicon, up to 1.0 percent by weight manganese, 16 to 18 percent by weight chromium, 0.40 to 0.65 percent by weight molybdenum, up to 0.04 weight percent phosphorous, up to 0.75 weight percent nickel, up to 0.75 weight percent copper and up to 0.03 weight percent sulfur.

In one non-limiting embodiment, 422 stainless steel includes 0.20 to 0.25 percent by weight carbon, up to 0.040 percent by weight phosphorous, 0.20 to 0.60 percent by weight silicon, 0.50 to 1.0 percent by weight nickel, 0.17 to 0.30 percent by weight vanadium, 1.0 percent by weight manganese, up to 0.030 percent by weight sulfur, 11.0 to 13.5 percent by weight chromium, 0.75 to 1.25 percent by weight molybdenum, 0.50 percent by weight copper, 0.75 to 1.25 percent by weight tungsten and is balanced with iron.

In one embodiment, the outer ring 610, the inner ring 620 and/or the plurality of rolling elements 603A and 603B are manufactured from the AeroCres®, an RBC proprietary bearing quality stainless steel material.

In one embodiment, the track roller assembly includes a split inner ring and a plurality of rolling elements in rolling engagement with the split inner ring, the track roller assembly being disposed in a structure of at least one of an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, and an Airbus A380 aircraft.

There is disclosed herein an actuation system for deploying and retracting a lift assisting device of an edge of a wing of an aircraft, the actuation system includes: a track pivotally coupled to the lift assisting device, the track having first and second outer surfaces and side surfaces; a shaft rotationally coupled within the wing of the aircraft and operable, in response to flight control signals, to deploy or retract the lift assisting device; means for actuating the lift assisting device, coupled to the shaft, between a retracted position to a deployed position along an arcuate path; a plurality of track roller bearings rotatably contacting the first and second outer surfaces of the track to guide the track along the arcuate path; and the plurality of track roller bearings including at least one track roller assembly having a split inner ring and a plurality of rolling elements in rolling engagement with the split inner ring. The plurality of track roller bearings includes at least one track roller assembly in rotational contact with an upper surface of the track and at least one track roller assembly in rotational contact with a lower surface of the track. Inn one embodiment, all of the plurality of track roller bearings are the track roller assemblies having the split inner ring and the plurality of rolling elements in rolling engagement with the split inner ring. In one embodiment, the at least one of the plurality of track roller bearings includes at least one lined track roller bearing. In one embodiment, the means for actuating is includes: an actuator arm coupled to the track; and an actuator lever coupled to the shaft and to the actuator arm; wherein when the shaft rotates in a first direction the actuator lever drives the actuator arm to move the track and the lift assisting device from the retracted to the deployed position along the arcuate path, and when the shaft rotates in a second direction the actuator lever drives the actuator arm to move the track and the lift assisting device from the deployed position to the retracted position along the arcuate path. In one embodiment, the actuation system further includes a mounting web enclosing at least a portion of the track and wherein the plurality of track roller bearings are coupled to the mounting web. In one embodiment, the track roller bearings are coupled to the mounting web with opposing bushings, a mounting pin and a nut. In one embodiment the opposing bushings are comprised of eccentric bushings and the nut is comprised of a castellated nut to allow adjustment to the track at fit-up. In one embodiment, the split inner ring includes a first section and a second section and the track roller assembly has a row of the plurality of rolling elements in rolling engagement with each of the first section and the second section. In one embodiment, the first section and the section are axially deflectable relative to each other in response to loads applied thereto. The inner ring, the outer ring and/or the rollers are manufactured from: 1) CRES material (e.g., 440C stainless steel); or 2) CREN material (e.g., Cronidur 30®, XD15NW® or 422 Stainless Steel).

There is disclosed herein an actuation system for deploying and retracting a lift assisting device of an edge of a wing of an aircraft, the actuation system including; a track pivotally coupled to the lift assisting device, the track having first and second outer surfaces and side surfaces; a shaft rotationally coupled within the wing of the aircraft and operable, in response to flight control signals, to deploy or retract the lift assisting device; means for actuating the lift assisting device, coupled to the shaft, between a retracted position to a deployed position along an arcuate path; a plurality of track roller bearings rotatably contacting the first and second outer surfaces of the track to guide the track along the arcuate path; the plurality of track roller bearings including at least one track roller assembly having an outer ring comprising at least two pieces; a single piece inner ring positioned in the outer ring; and one or more rows of a plurality of rolling elements disposed between and in rolling engagement with the outer ring and the single piece inner ring. In one embodiment, at least one track roller assembly is in rotational contact with an upper surface of the track and at least one track roller assembly in rotational contact with a lower surface of the track. In one embodiment, all of the plurality of track roller bearings are the track roller assemblies having the single piece inner ring positioned in the at least one outer ring and the plurality of rolling elements in rolling engagement with the single piece inner ring. In one embodiment the means for actuating is includes: an actuator arm coupled to the track; and an actuator lever coupled to the shaft and to the actuator arm; wherein when the shaft rotates in a first direction the actuator lever drives the actuator arm to move the track and the lift assisting device from the retracted to the deployed position along the arcuate path, and when the shaft rotates in a second direction the actuator lever drives the actuator arm to move the track and the lift assisting device from the deployed position to the retracted position along the arcuate path. In one embodiment, the actuation system further includes a mounting web enclosing at least a portion of the track and wherein the plurality of track roller bearings are coupled to the mounting web. In one embodiment, the track roller bearings are coupled to the mounting web with opposing bushings, a mounting pin and a nut. In one embodiment, the opposing bushings are comprised of eccentric bushings and the nut is comprised of a castellated nut to allow adjustment to the track at fit-up. In one embodiment, a plurality of side roller bearings rotatably contacting at least one side of the track to guide the track along the arcuate path. In one embodiment, at least one of the plurality of side roller bearings, the track roller assembly having the single piece inner ring positioned in the at least one outer ring. In one embodiment, the at least one track roller assembly is disposed in a structure of at least one of an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, and/or an Airbus A380 aircraft. In one embodiment, at least one of the single piece inner ring, the plurality of rolling elements and an at least one outer ring disposed around the inner ring is manufactured from one of a CREN material, a CRES material and AeroCres®. In one embodiment, the CRES material is 440C stainless steel. In one embodiment, the CREN material is one of Cronidur 30®, XD15NW® and 422 Stainless Steel.

Although the invention has been described with reference to particular embodiments thereof, it will be understood by one of ordinary skill in the art, upon a reading and understanding of the foregoing disclosure that numerous variations and alterations to the disclosed embodiments will fall within the spirit and scope of this invention and of the appended claims.

What is claimed is:

1. An actuation system for deploying and retracting a lift assisting device of an edge of a wing of an aircraft, the actuation system comprising:
   a track pivotally coupled to the lift assisting device, the track having first and second outer surfaces and side surfaces;
   a shaft rotationally coupled within the wing of the aircraft and operable, in response to flight control signals, to deploy or retract the lift assisting device;
   means for actuating the lift assisting device, coupled to the shaft, between a retracted position to a deployed position along an arcuate path;
   a plurality of track roller bearings rotatably contacting the first and second outer surfaces of the track to guide the track along the arcuate path; and
   the plurality of track roller bearings including at least one track roller bearing having:
      an outer ring with at least one outer raceway and an inner ring, the inner ring having a split extending circumferentially around and defining a first side of the inner ring and a second side of the inner ring;
      a first row of needle rolling elements in rolling engagement with the first side of the inner ring and a first raceway of the outer ring; and
      a second row of needle rolling elements in rolling engagement with the second side of the inner ring and a second raceway of the outer ring.

2. The actuation system of claim 1, wherein the plurality of track roller bearings includes at least one track roller bearing in rotational contact with an upper surface of the track and at least one track roller bearing in rotational contact with a lower surface of the track.

3. The actuation system of claim 1, wherein all of the plurality of track roller bearings are the track roller bearings having the inner ring and the plurality of rolling elements in rolling engagement with the inner ring and outer ring.

4. The actuation system of claim 1, wherein the at least one of the plurality of track roller bearings includes at least one lined track roller bearing.

5. The actuation system of claim 1, wherein the means for actuating is comprised of:
   an actuator arm coupled to the track; and
   an actuator lever coupled to the shaft and to the actuator arm;
   wherein when the shaft rotates in a first direction the actuator lever drives the actuator arm to move the track and the lift assisting device from the retracted to the deployed position along the arcuate path, and when the shaft rotates in a second direction the actuator lever drives the actuator arm to move the track and the lift assisting device from the deployed position to the retracted position along the arcuate path.

6. The actuation system of claim 1, wherein the actuation system further includes a mounting web enclosing at least a portion of the track and wherein the plurality of track roller bearings are coupled to the mounting web.

7. The actuation system of claim 6, wherein the track roller bearings are coupled to the mounting web with opposing bushings, a mounting pin and a nut.

8. The actuation system of claim 7, wherein the opposing bushings are comprised of eccentric bushings and the nut is comprised of a castellated nut to allow adjustment to the track at fit-up.

9. The actuation system of claim 1 further comprising a plurality of side roller bearings rotatably contacting at least one side of the track to guide the track along the arcuate path.

10. The actuation system of claim 9 wherein at least one of the plurality of side roller bearings is a lined side roller bearing.

11. The actuation system of claim 4, wherein at least one of the at least one lined track roller assemblies comprises an inner ring having an outer bearing surface and an outer ring having an inner bearing surface the inner ring being disposed at least partially in the outer ring and a self lubricating liner is disposed on at least one of the outer bearing surface and the inner bearing surface.

12. The actuation system of claim 1, wherein the first side and the second side of the inner ring are axially deflectable relative to each other in response to loads applied thereto.

13. The actuation system of claim 1, wherein the actuation system is disposed in a structure of at least one of an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, and an Airbus A380 aircraft.

14. The actuation system of claim 1, wherein at least one of the inner ring, the plurality of rolling elements and an outer ring disposed around the inner ring is manufactured from one of a corrosion resistant nitrogen steel (CREN) material, and a corrosion resistant steel (CRES) material.

15. The actuation system of claim 14, wherein the CRES material is 440C stainless steel.

16. The actuation system of claim 14, wherein the CREN material is one of Cronidur 30®, XD15NW® and 422 Stainless Steel.

17. An actuation system for deploying and retracting a lift assisting device of an edge of a wing of an aircraft, the actuation system comprising:
a track pivotally coupled to the lift assisting device, the track having first and second outer surfaces and side surfaces;
a shaft rotationally coupled within the wing of the aircraft and operable, in response to flight control signals, to deploy or retract the lift assisting device;
means for actuating the lift assisting device, coupled to the shaft, between a retracted position to a deployed position along an arcuate path; and
a plurality of track roller bearings rotatably contacting the first and second outer surfaces of the track to guide the track along the arcuate path;
the plurality of track roller bearings including at least one track roller bearing having:
a first outer ring, a second outer ring, and a gap extending circumferentially between the first outer ring and the second outer ring;
a single piece inner ring positioned in the first outer ring and the second outer ring;
a first row of needle rolling elements disposed between and in rolling engagement with the first outer ring and the single piece inner ring; and
a second row of needle rolling elements disposed between and in rolling engagement with the second outer ring and the single piece inner ring,
wherein at least one of the single piece inner ring, the first outer ring and the second outer ring is manufactured from corrosion resistant nitrogen steel (CREN) material, and the plurality of rolling elements is manufactured from a CREN material or a corrosion resistant steel (CRES) material, so that the plurality of track roller bearings are configured to carry and distribute load conditions experienced by the track during operation of the actuation system.

18. The actuation system of claim 17, wherein at least one track roller bearing is in rotational contact with an upper surface of the track and at least one track roller bearing in rotational contact with a lower surface of the track.

19. The actuation system of claim 17, wherein all of the plurality of track roller bearings are the track roller bearings having the single piece inner ring positioned in the at least one outer ring and the plurality of rolling elements in rolling engagement with the single piece inner ring.

20. The actuation system of claim 17, wherein the means for actuating is comprised of:
an actuator arm coupled to the track; and
an actuator lever coupled to the shaft and to the actuator arm;
wherein when the shaft rotates in a first direction the actuator lever drives the actuator arm to move the track and the lift assisting device from the retracted to the deployed position along the arcuate path, and when the shaft rotates in a second direction the actuator lever drives the actuator arm to move the track and the lift assisting device from the deployed position to the retracted position along the arcuate path.

21. The actuation system of claim 17, wherein the actuation system further includes a mounting web enclosing at least a portion of the track and wherein the plurality of track roller bearings are coupled to the mounting web.

22. The actuation system of claim 21, wherein the track roller bearings are coupled to the mounting web with opposing bushings, a mounting pin and a nut.

23. The actuation system of claim 22, wherein the opposing bushings are comprised of eccentric bushings and the nut is comprised of a castellated nut to allow adjustment to the track at fit-up.

24. The actuation system of claim 17 comprising a plurality of side roller bearings rotatably contacting at least one side of the track to guide the track along the arcuate path.

25. The actuation system of claim 24 wherein at least one of the plurality of side roller bearings, the track roller bearing having the single piece inner ring positioned in the at least one outer ring.

26. The actuation system of claim 17, wherein the actuation system is disposed in a structure of at least one of an Airbus A-350 aircraft, an Airbus A-320 aircraft, an Airbus A320Neo aircraft, an Airbus A330 aircraft, an Airbus A330Neo aircraft, an Airbus A321 aircraft, an Airbus A340 aircraft, and an Airbus A380 aircraft.

27. The actuation system of claim 17, wherein the CREN material is one of Cronidur 30®, XD15NW® and 422 Stainless Steel.

28. An actuation system for deploying and retracting a lift assisting device of an edge of a wing of an aircraft, the actuation system comprising:
a track pivotally coupled to the lift assisting device, the track having first and second outer surfaces and side surfaces;
a shaft rotationally coupled within the wing of the aircraft and operable, in response to flight control signals, to deploy or retract the lift assisting device;
means for actuating the lift assisting device, coupled to the shaft, between a retracted position to a deployed position along an arcuate path; and
a plurality of track roller bearings rotatably contacting the first and second outer surfaces of the track to guide the track along the arcuate path;

the plurality of track roller bearings including at least one track roller bearing having:
an single piece outer ring;
a single piece inner ring positioned in the outer ring; and
one or more rows of a plurality of rolling elements disposed between and in rolling engagement with the single piece outer ring and the single piece inner ring,
wherein the plurality of rolling elements is manufactured from a corrosion resistant steel (CRES) material, so that the plurality of track roller bearings are configured to carry and distribute load conditions experienced by the track during operation of the actuation system.

* * * * *